United States Patent
Arngren et al.

(10) Patent No.: US 11,960,091 B2
(45) Date of Patent: Apr. 16, 2024

(54) METHOD AND DEVICE FOR CONTROLLING DISPLAY OF CONTENT

(71) Applicant: Telefonaktiebolaget LM Ericsson (publ), Stockholm (SE)

(72) Inventors: Tommy Arngren, Södra Sunderbyn (SE); Andreas Kristensson, Södra Sandby (SE); Peter Ökvist, Luleå (SE); Jonas Pettersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/927,667

(22) PCT Filed: May 27, 2020

(86) PCT No.: PCT/EP2020/064728
§ 371 (c)(1),
(2) Date: Nov. 23, 2022

(87) PCT Pub. No.: WO2021/239223
PCT Pub. Date: Dec. 2, 2021

(65) Prior Publication Data
US 2023/0213764 A1    Jul. 6, 2023

(51) Int. Cl.
*G02B 27/01*    (2006.01)
*G06F 3/01*    (2006.01)

(52) U.S. Cl.
CPC ......... *G02B 27/0172* (2013.01); *G06F 3/012* (2013.01); *G06F 3/013* (2013.01); *G02B 2027/0187* (2013.01)

(58) Field of Classification Search
CPC ........ G02B 2027/0187; G02B 27/0172; G06F 3/013; G06F 3/012
See application file for complete search history.

(56) References Cited

U.S. PATENT DOCUMENTS

2012/0235902 A1*  9/2012  Eisenhardt .............. G06F 3/017
345/156
2014/0015736 A1   1/2014  Kim
(Continued)

OTHER PUBLICATIONS

International Search Report and Written Opinion with Transmittal dated Apr. 21, 2021 in International Application No. PCT/EP2020/064728 (25 pages).

(Continued)

*Primary Examiner* — Abbas I Abdulselam
(74) *Attorney, Agent, or Firm* — Sage Patent Group

(57) ABSTRACT

Embodiments of the present disclosure provide a method, a computer program product, and a wearable device for controlling display of content. The method is performed in a wearable device (10) comprising a head mounted display having a display region (12). The method comprises causing (S12) to display a first visual content (32) on a first portion (14) of the display region, corresponding to an eye gaze direction (22) of the user (20). The method comprises determining (S13) to transmit a second visual content (34) to one or more external display devices (40a-40 n) based on presence of the one or more external display devices (40a-40 n) in a field of view, FoV, of the wearable device (10). Further, the method comprises sending (S14) a request to at least one of the one or more external display devices (40a-40 n) to display the second visual content (34). The method further comprises causing (S15) to display the second visual content (34), at least outside the first portion (14) of the display region (12). The resolution of the first visual content (32) is higher than the resolution of the second visual content (34).

19 Claims, 16 Drawing Sheets

(56) References Cited

U.S. PATENT DOCUMENTS

| | | | |
|---|---|---|---|
| 2015/0049002 A1* | 2/2015 | Ishikawa | G09G 3/003 |
| | | | 345/8 |
| 2016/0349838 A1* | 12/2016 | Solomon | G02B 27/0093 |
| 2016/0370855 A1 | 12/2016 | Lanier et al. | |
| 2017/0235360 A1* | 8/2017 | George-Svahn | G02B 27/017 |
| | | | 345/173 |
| 2018/0075654 A1 | 3/2018 | Vembar et al. | |
| 2018/0293041 A1 | 10/2018 | Harviainen | |
| 2019/0096136 A1 | 3/2019 | Yuan et al. | |
| 2019/0238939 A1* | 8/2019 | Kwon | H04N 21/41265 |
| 2019/0327443 A1 | 10/2019 | Leech et al. | |
| 2020/0050417 A1* | 2/2020 | Araújo | G06F 1/3212 |

OTHER PUBLICATIONS

Wikipedia, "Field of view", https://en.wikipedia.org/wiki/Field_of_view, Jun. 22, 2020 (5 pages).

Wikipedia, "Fovea centralis", https://en.wikipedia.org/wiki/Fovea_centralis, Jun. 22, 2020 (9 pages).

Wikipedia, "Foveated rendering", https://en.wikipedia.org/wiki/Foveated_rendering, Jun. 22, 2020 (3 pages).

* cited by examiner

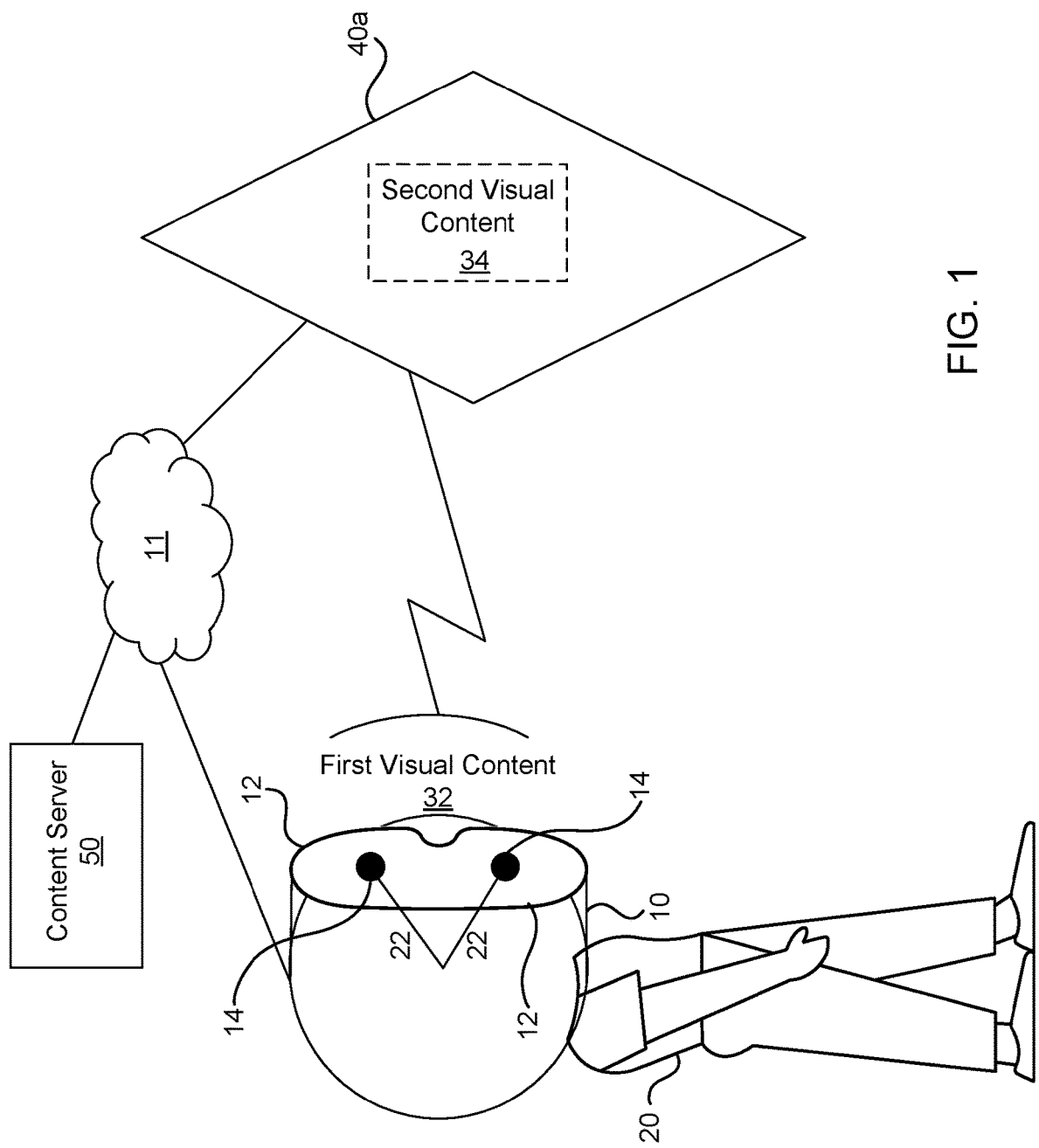

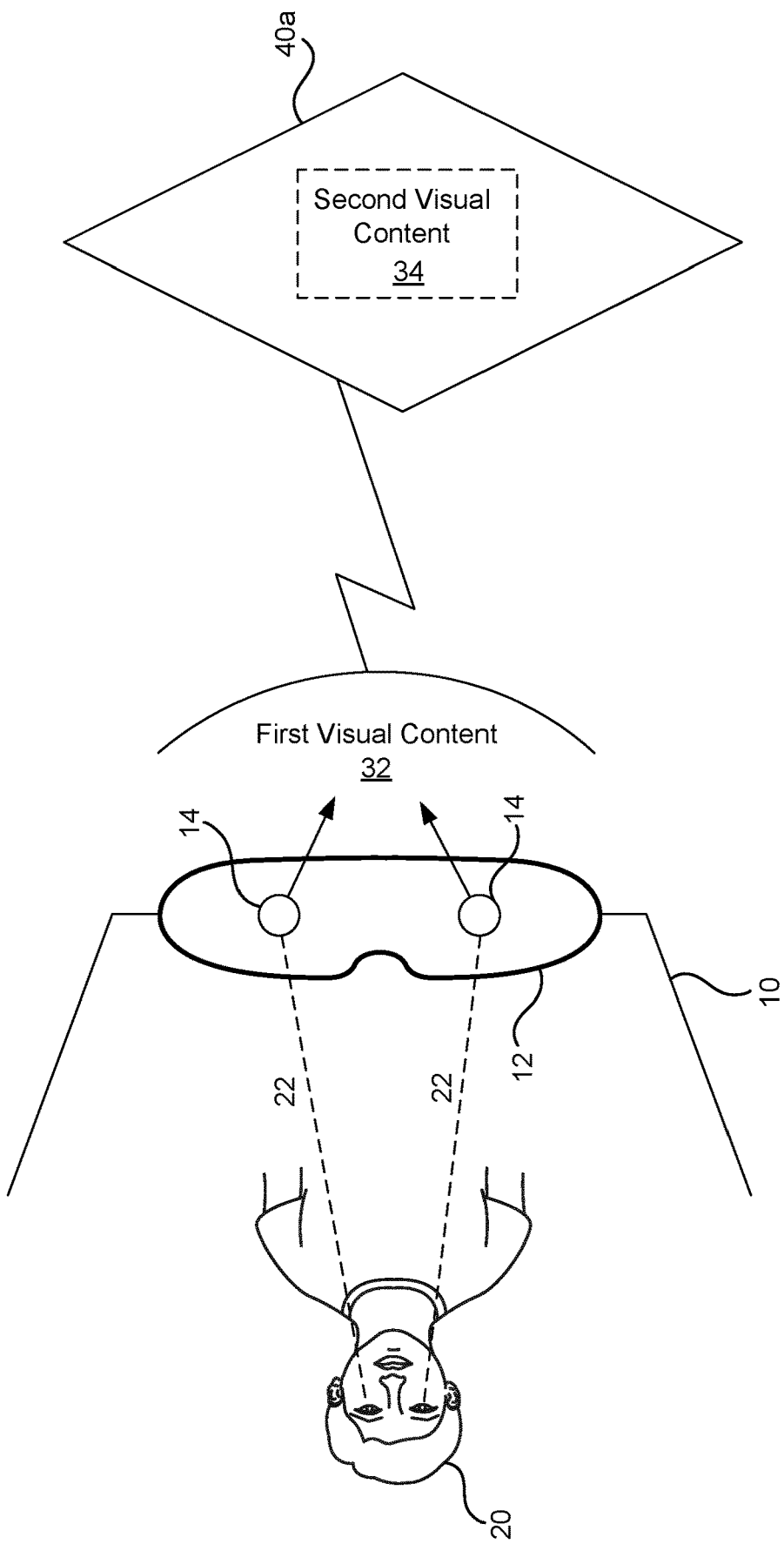

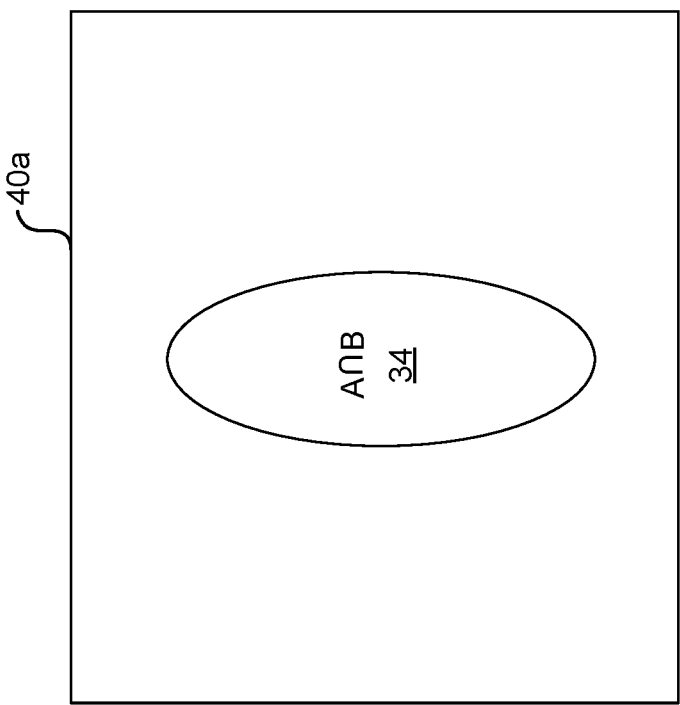
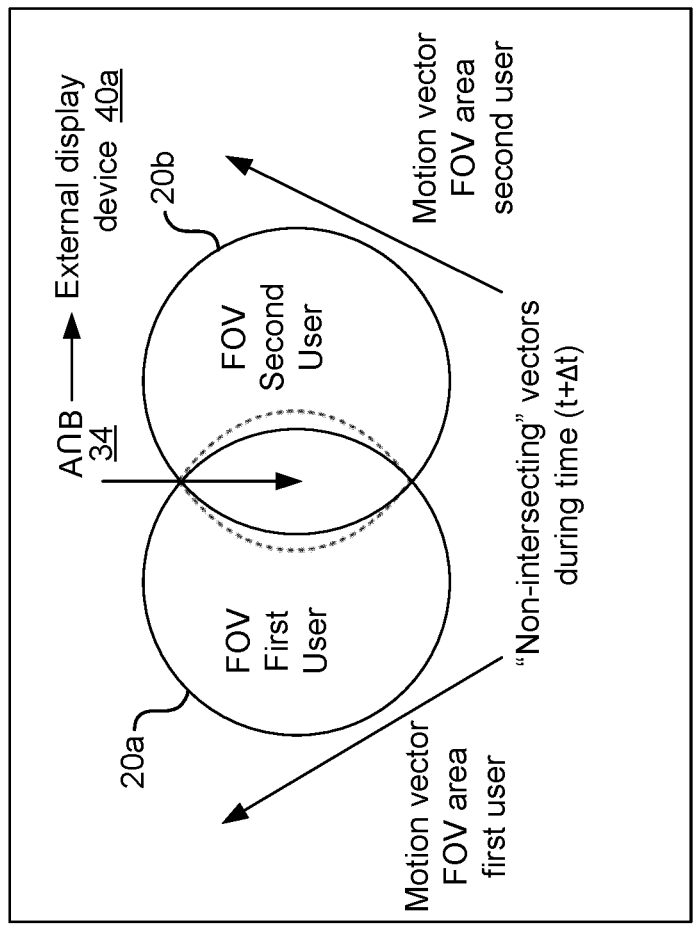
FIG. 10

METHOD AND DEVICE FOR CONTROLLING DISPLAY OF CONTENT

CROSS REFERENCE TO RELATED APPLICATIONS

This application is a 35 U.S.C. § 371 National Stage of International Patent Application No. PCT/EP2020/064728, filed May 27, 2020.

TECHNICAL FIELD

The present disclosure relates to a method, wearable devices, and a computer program product for controlling display of content using external display device(s). More particularly, to transmission of content to the external display device(s) for display of content.

BACKGROUND

Augmented reality (AR) is foreseen to become an integral technology in the networked society and potently disrupt the consumer electronics market. AR is here used to denote the concept of presenting a combination of real-world objects and computer-rendered content to a user.

Specifically, one implementation of AR implies layering information such as text, images or videos on top of reality, on a user's view of the world via a see-through Head Mounted Display (HMD). One application of AR is to allow users to see and interact remotely and in 3D (three dimension), as if each participant share the same physical space. Hence, remote communication and interaction could become as natural as face-to-face communication.

Foveated rendering is an existing rendering technique where an image quality or content quality is reduced in a peripheral vision, i.e. a zone outside of the zone being gazed by a fovea in the eye which is responsible for the sharp central vision. The foveated rendering makes use of eye gaze tracking to determine where the user is looking i.e., user's gazing direction.

Existing wearable devices which include extended reality (XR) glasses or the like implement functionality of foveated rendering to reduce rendering workload on the XR glasses, render both the high quality content parts and the low quality content parts on the displays of the XR glasses. Further, the existing XR glasses have a limited field of view (FoV). However, with an increase in the FoV for the emerging XR glasses, there can be a significant impact on compute power and battery power usage to render the low-quality content parts on the displays of the XR glasses.

Apart from processing load and battery power consumption at the XR glasses, the transfer of total amount of data bits over an often limited/constrained communication interface (e.g. over air interface) consumes shared resources, which may lead to increase in usage of resources with emerging use of XR glasses.

Consequently, there is a need to improve the display of content in the wearable device.

SUMMARY

It is therefore an object of the present disclosure to provide a method, a computer program product, and a wearable device for controlling display of content that seeks to mitigate, alleviate, or eliminate all or at least some of the above-discussed drawbacks of presently known solutions.

This and other objects are achieved by means of a method, a computer program product, and a device as defined in the appended claims. The term exemplary is in the present context to be understood as serving as an instance, example or illustration.

According to a first aspect of the present disclosure, a method for controlling display of content is provided. The method is performed in a wearable device. The wearable device comprising a head mounted display having a display region. The method comprises causing to display a first visual content on a first portion of the display region, corresponding to an eye gaze direction of the user. The method comprises determining to transmit a second visual content to one or more external display devices based on presence of the one or more external display devices in a field of view, FoV, of the wearable device. Further, the method comprises sending a request to at least one of the one or more external display devices to display the second visual content.

The first visual content and the second visual content may comprise a streaming video content, a gaming application, a computer rendered content, a graphics content or the like.

In some examples, the first visual content and the second visual content are associated with a same content and in some examples, the first visual content and the second visual content are associated with a different content.

In some examples, a resolution of the first visual content is higher than a resolution of the second visual content. It is to be noted that the first visual content is a high quality content and the second visual content is a low quality content. Thus, with the proposed method, the high quality content is displayed on the first portion of the display region, corresponding to an eye gaze direction of the user and the low quality content is displayed on the external display device(s). The external display device(s) can be a private display devices or a public display devices. The private display device displays higher quality content with more details, and a public display device typically (for privacy concerns) ensures that low quality content is displayed without any details.

Advantageously, the proposed method allows to display the second visual content (i.e., the low quality content) on the external display device(s) while the first visual content (which is the high quality content) is being displayed in the wearable device. This enables the wearable device to save compute power and display power on the wearable device. Thus, the high-quality content is rendered in the wearable device and the low-quality content is rendered when applicable and when the external display device(s) are available in order to save compute power, transmission link capacity, and display power on the wearable device.

When the external device(s) are present in the user's FoV (as experienced through the wearable device), the wearable device transmits a request to the external device(s) for displaying the second visual content and the external display device(s) display the low quality foveated rendering that matches the specific part of the user's FoV. Multiple external display devices in a user's FoV can be used for displaying the low quality content.

Further, the wearable device communicates with the external display device(s), information on how to render the low quality content, either directly or through a content server, a gateway or a rendering distribution system to the external display device(s). With the proposed method, the FoV of the user increases (when the external devices are present which covers the user's FoV) for the wearable device. It is to be noted that the low quality content for displaying on the external display device may be routed through a dedicated communication interface instead of sharing an existing communication interface.

The control signaling may be initiated from the wearable device to the external display device(s) by having an identifier (ID) tag that the wearable device can use for identification and access to external display device(s). This ID tag may typically contain necessary "login token" and "IP address", or any equivalent.

In some aspects, the proposed method can be used to provide user integrity. For example, in a scenario which includes lazy-watching of a soccer game holds less privacy aspects and is less woundable (or targeted) for intrusions, but in a scenario for using the wearable device/external display device for banking purposes, online purchase, money transfers, etc., higher integrity and privacy concerns are applied with respect to the data and protection, before directing the content to the external display device(s).

In some examples, the method comprises causing to display the second visual content, at least outside the first portion of the display region. The second visual content may be displayed on the display region excluding the first portion. The wearable device can use a foveated rendering algorithm to display the first visual content on the first portion of the display region corresponding to the eye gaze direction of the user and the remaining portion of the display region may be used for displaying the second visual content.

The method further comprises optionally a step of determining the eye gaze direction, wherein the eye gaze direction is determined based on at least one of: a tracked eye gaze direction of the user on the display region of the wearable device, an identified type of content or an application being displayed on the first portion of the display region and detected occurrence of one or more events in a predetermined range of the wearable device. The eye gaze direction of the user may be determined using eye gaze cameras equipped in the wearable device. Thus, the eye gaze direction of the user may be tracked continuously to display the first visual content on the first portion of the display region. In the simplest case, the eye gaze direction is assumed to be in the center of the display region of the wearable device. In some aspects, the eye gaze direction may be dependent on a type of content which determines a size of the first portion of the display region. Further, the eye gaze direction may be determined based on the type of content or an application being displayed on the first portion of the display region. For example, when the user is viewing a news content which is a slow-changing content, there may be a less change in the eye gaze direction, as determined using the eye gaze tracking cameras. In case, when the user is viewing a sporting content, there may be a high change in the eye gaze direction.

Furthermore, there may be occurrence of events in the predetermined range of the wearable device which cause the head movements and/or the change in the eye gaze direction. The events may include visual events in the first visual content and the second visual content, events occurring in real world including auditory events, perceptive events and events related to haptic feedback. The occurrence of these events cause the head movement and/or the movement in the eye gaze direction. The head movement and/or the movement in the eye gaze direction may be continuously tracked using the eye gaze tracking cameras and the first visual content is displayed on the display region based on the determined head movement and/or the movement in the eye gaze direction.

In some examples, the method comprises optionally a step of obtaining, from the user, an input comprising one or more parameters related to display of the first visual content on the first portion of the display region and causing to display the first visual content based on the obtained input. The input may include a gesture input or a voice command. For example, the user may perform a swipe gesture to change the first visual content being displayed on the first portion of the display region. In another example, the user may perform a pinch gesture to change the gaze area size on the first portion of the display region. The user may also pre-define settings (i.e., settings related to context/location or content) related to the size of first visual content corresponding to the eye gaze direction. Further, the user input may include other settings which may be associated to a defined difference between the high quality rendering on the first portion and low quality rendering on the external display device(s) based on context, content, or network load etc.

The step of causing to display the first visual content on the first portion of the display region optionally comprises determining the first visual content to be displayed on the first portion of the display region, determining whether the user is in motion using one or more motion determining sensors, and causing to display the first visual content on the first portion of the display region, in response to determining that the user is not in motion. The method further comprises aligning the first visual content on the first portion of the display region and causing to display the first visual content on the first portion of the display region based on a threshold value associated with the determined motion.

In one embodiment, optionally the step of sending the request comprises sending the request to a content server, requesting the content server to transmit the second visual content to the at least one of the one or more external display devices. In such an embodiment, the wearable device is completely offloaded in handling the second visual content 34, thereby reducing power usage even more in the wearable device 10.

In another embodiment, optionally the step of sending a request to one or more external display devices to display a second visual content comprises selecting the at least one of the one or more external display devices based on a distance between the wearable device and the respective external display device, determining the second visual content to be suitable for being displayed on the selected at least one external display device of the one or more external display devices and causing to display the second visual content on a portion of a display region associated with the selected at least one external display device of the one or more external display devices. The portion of the display region associated with the one or more external display devices is defined based on a field of view, FoV, of the wearable device.

In some examples, a portion of the display region for displaying the second visual content is a complete FoV of the wearable device.

In some examples, a portion of the display region for displaying the second visual content is a partial FoV of the wearable device.

In some examples, a portion of the display region for displaying the second visual content is larger than the FoV of the wearable device.

Optionally, the step of determining to transmit the second visual content to the at least one of the one or more external display devices comprises determining that at least two users are viewing same visual content on respective wearable devices, identifying an overlap of the users respective eye gaze directions and/or an overlap between the user's respective FoV of the wearable devices, and determining the one or more external display devices in a FoV of the respective wearable devices. The method further comprises causing to display the first visual content corresponding to the identified overlap between the users respective eye gaze directions on the at least one of the one or more external devices, and causing to display the second visual content corresponding to the identified overlap between the user's respective FoV on the at least one of the one or more external display devices.

In some examples, optionally, the step of determining to transmit the second visual content to at least one of the one or more external display devices comprises determining a movement pattern of the at least two users viewing the same visual content on respective wearable devices, predicting an overlap between the users respective eye gaze directions and/or predicting an overlap between the user's respective FoV based on the movement pattern, and determining to transmit the second visual content to at least one of the one or more external display devices based on the prediction.

Optionally, the step of determining a movement pattern of the at least two users viewing same visual content on respective wearable devices comprises identifying a change in users respective eye gaze directions and/or the user's respective FoV, and determining the movement pattern based on the change in the users respective eye gaze directions and/or the user's respective FoV. The method further comprises determining to transmit the second visual content corresponding to the identified overlap between the user's respective FoV to the at least one of the one or more external display devices based on the determined movement pattern.

According to a second aspect of the present disclosure, a wearable device for controlling display of content is provided. The wearable device comprising a head mounted display (HMD), having a display region, a processing circuitry, and a memory storing instructions when executed by the processing circuitry cause the wearable device to: display a first visual content on a first portion of the display region, corresponding to an eye gaze direction of the user; determine to transmit a second visual content to one or more external display devices based on presence of the one or more external display devices in a field of view, FoV of the wearable device; and send a request to at least one of the one or more external display devices to display the second visual content.

In some examples, the wearable device is a HMD device, smart glasses, extended reality (XR) glasses or the like.

According to a third aspect of the present disclosure, there is provided a computer program product comprising a non-transitory computer readable medium, having thereon a computer program comprising program instructions. The computer program is loadable into a data processing unit circuitry and configured to cause execution of the method according to the first aspect when the computer program is run by the processing circuitry.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 1 discloses an example environment for controlling display of content;

FIGS. 2A and 2B disclose example illustrations for controlling display of content in a wearable device;

FIG. 10 is an example illustration of displaying the second visual content on the external display device(s) when users are moving in opposite direction;

DETAILED DESCRIPTION

Figure 2B:
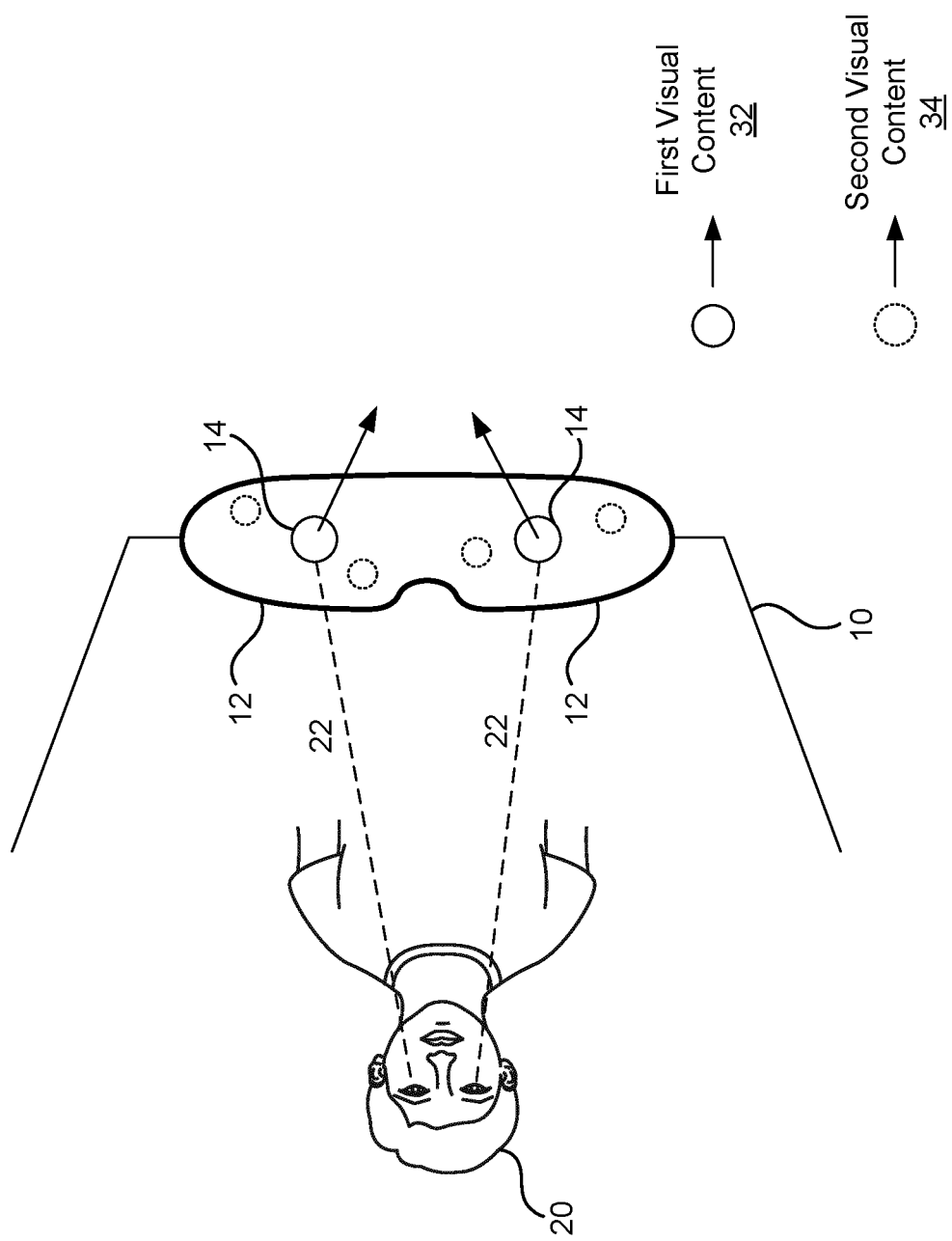

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 discloses an example environment for controlling display of content. A user 20 wears a wearable device 10. The wearable device 10 comprises a head mounted display (HMD). The HMD is head-mounted display device mounted on a user's head to view an image or a content which is emerging. The HMD is mounted on a part of a body, for example, a head, of a user to display the content implementing extended reality (XR). Such a HMD device 10 has a goggle shape or a glasses shape, as shown in FIG. 1. A glasses-type HMD device includes a display region 12 for displaying the content.

The wearable device 10 (i.e., the HMD), allows the user 20 to see both real-world objects and computer-rendered content. Real-world objects are physical objects which are not computer-rendered, i.e., not virtual. For instance, the HMD can be implemented using extended reality (XR) glasses such as Microsoft HoloLens. It is to be noted that the term 'computer' used herein is to be interpreted as any electronic device with digital processing capabilities, regardless of size. Hence, the term computer comprises devices such as servers, desktop computers, laptop computers, tablet computers, smart phones, mobile phones, smart watches, etc.

Since the user 20 can experience a combination of real-world objects and computer-rendered content, the wearable device 10 allows for a plethora of applications in the field often referred to augmented reality (AR). The computer rendered content can be displayed using the wearable device 10 and the external display device 40a. The computer-rendered content can be any combination of text, images, video, gaming content and computer generated graphics or the like.

For example, the computer rendered content includes a first visual content 32 and a second visual content 34. The first visual content 32 can be, for example, a high resolution content and the second visual content can be, for example, a low resolution content.

In an embodiment, the first visual content 32 can be displayed on a first portion 14 of a display region 12 of the wearable device 10 as shown in FIG. 1. For example, the first visual content 32 can be displayed on the first portion 14 of the display region 12, corresponding to an eye gaze direction 22 of the user 20.

According to embodiments presented herein, at least part of the content i.e., the second visual content 34, originally intended for display using the wearable device 10 can be transmitted or offloaded from the wearable device 10 to an external display device 40a for displaying the second visual content 34. This can save a significant amount of power in the wearable device 10, thus prolonging battery life in the wearable device 10.

It is to be noted that the term external implies that the external display device 40a is external in relation to the wearable device 10. The external display device 40a is any type of device comprising a display screen which can be used to display computer-rendered content. For instance, the external display device 40a can be any of a television, a computer screen, a smart phone, a smart watch, a tablet computer, a projector, etc. While only one external display device 40a is shown in FIG. 1, any number of external display devices 40b-40n (not shown) may be present in proximity or in a pre-determined range of the user 20. Although, there may exist many external display devices 40b-40n (not shown in FIG. 1), in various embodiments of the present disclosure, the external display devices 40a-40n are explained with only the external display device 40a.

Each one of the wearable device 10 and the external display device 40a is connected to a network 11. The network 11 can e.g. be a local area network (LAN) and/or a wide area network (WAN) such as the Internet. A content server 50 is also connected to the network 11. The content server 50 provides content for rendering at the wearable device 10 and/or the external display device 40a. It should be noted that the various embodiments disclosed herein may be implemented in the content server 50 or at gateway or in distributed cloud for rendering the content at the wearable device 10 and/or the external display device 40a.

Moreover, there is a communication link between the wearable device 10 and the external device 40a. For example, the communication link between the wearable device 10 and the external device 40a can be implemented as a point-to-point communication link or the communication link can be implemented through the network 11.

The wearable device 10 and the external display device 40a may include various modules configured for controlling the display of content as described above. The various modules of the wearable device 10 and the external display device 40a will be further detailed in conjunction with figures in later parts of the description.

FIGS. 2A and 2B disclose example illustrations for controlling display of content in the wearable device 10. The eye gaze direction 22 of the user 20 may be tracked using gaze tracking camera(s) equipped in the wearable device 10. For example, the gaze tracking camera(s) may include RGB cameras, depth cameras, and eye ball tracking cameras or the like. When the user 20 wears the wearable device 10, the eye gaze direction 22 of the user 20 may be tracked on the display region 12 of the wearable device 10.

In an embodiment, the first visual content 32 may be displayed on the first portion 14 of the display region 12 corresponding to a limited region in the eye gaze direction 22 of the user 20 as shown in FIG. 2A. Thus, the first visual content 32 (i.e., a high quality content) may be displayed on the first portion 14 of the display region 12 corresponding to the eye gaze direction 22 of the user 20.

The presence of the external display device(s) in a field of view, FoV, of the wearable device 10 may be determined for displaying the second visual content. For example, the one or more external display devices may be determined within a pre-determined range (for example, a few meters) of the wearable device 10. Upon determining the presence of the external display devices, one of the external display device (i.e., the external display device 40a) may be selected based on a distance between the wearable device 10 and the respective external display device 40a-40n. Further, the second visual content 34 to be suitable (i.e., for example, a 3D video content) for displaying on the selected external display device 40a may be determined and then the second visual content 34 is displayed on a portion of a display region (shown with dotted lines) associated with the selected external display device 40a as shown in FIG. 2A.

In another embodiment, the second visual content 34 may be displayed at least outside the first portion 14 of the display region 12 of the wearable device 10. For example, the first visual content 32 is displayed on the first portion 14 of the display region 12 of the wearable device 10 and the second visual content 34 is displayed outside the first portion 14 (i.e., the region excluding the first portion 14) of the display region 12 of the wearable device 10 as shown in FIG. 2B. Thus, the first visual content 32 is displayed in the first portion 14 of the display region 12 of the wearable device and the second visual content 34 is displayed outside the first portion 14 of the display region 12.

As shown in FIG. 2B, the human eye has high resolution only in the eye gazing direction 22. That is, for example, a part of a FoV corresponding to a front center (or a center part) of the FoV has full resolution, a surrounding part surrounding the center part where the second visual content 34 is displayed has resolution of about 60%, and a peripheral part of the field of view has resolution of about 20%. That is, as shown in FIG. 2B, it is to be understood that the resolution of the second visual content 34 may be gradually or stepwise decreased from the center part to the peripheral part.

Figure 3:
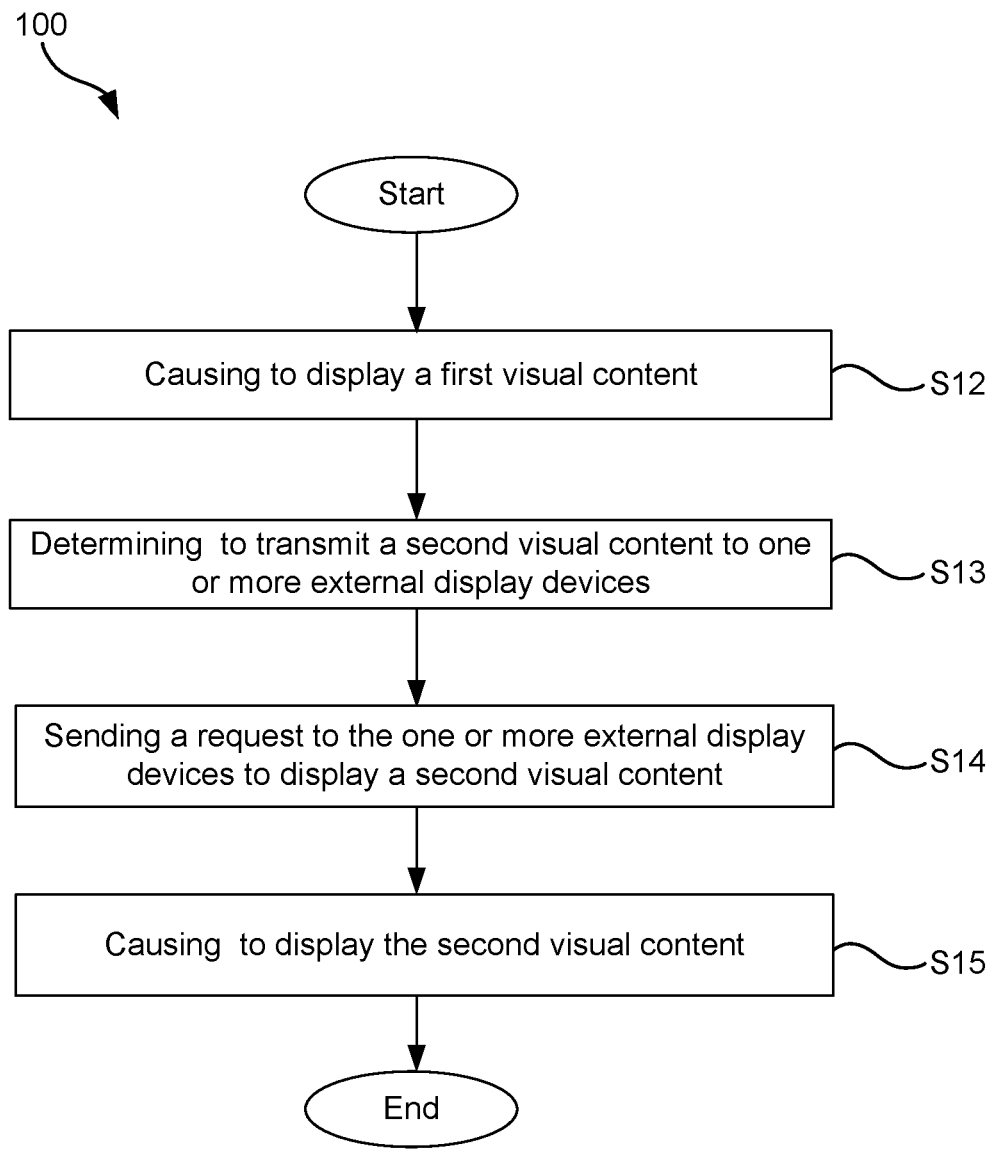
FIG. 3 is a flowchart illustrating example method steps for controlling display of content in the wearable device.

FIG. 3 is a flowchart illustrating example method 100 steps for controlling display of content in the wearable device. The content can be a computer rendered content which includes a first visual content and a second visual content. As stated above, the first visual content can be, for example, a high resolution content and the second visual content can be, for example, a low resolution content. At step S12, the method 100 comprises causing to display the first visual content on the first portion of the display region, corresponding to an eye gaze direction of the user. The eye gaze direction of the user includes the gaze of the user on the display region of the wearable device 10. The eye gaze direction of the user may be tracked continuously using gaze tracking camera(s) equipped in the wearable device.

In an embodiment, the eye gaze direction of the user may be determined based on a tracked eye gaze direction of the user on the display region of the wearable device using the gaze tracking camera(s) equipped in the wearable device.

In another embodiment, the eye gaze direction of the user may be determined based on an identified type of content or an application being displayed on the first portion of the display region. For example, the type of content may include a video streaming content, text, images, video and computer generated graphics or the like and the application can be a gaming application or the like.

In some embodiments, the eye gaze direction of the user may be determined based on detected occurrence of one or more events in a predetermined range of the wearable device. For example, the one or more events comprises visual events in the first visual content and the second visual content, events occurring in real world including auditory events, perceptive events and events related to haptic feedback. The occurrence of the events may cause the head movement and/or the movement in the eye gaze direction of the user. Therefore, these events are detected for determining the head movement and/or the movement in the eye gaze direction.

Thus, the eye gaze direction of the user may be determined based on a tracked eye gaze direction of the user on the display region of the wearable device, an identified type of content or an application being displayed on the first portion of the display region and the detected occurrence of one or more events in a predetermined range of the wearable device.

Further, the wearable device continuously receives the eye gaze direction of the user from the gaze tracking camera(s) and displays the first visual content on the first portion of the display region, corresponding to the eye gaze direction of the user. Thus, the wearable device displays the first visual content which is a high resolution content along the eye gaze direction of the user on the first portion of the display region.

At step S13, the method 100 comprises determining to transmit a second visual content 34 to one or more external display devices based on presence of the one or more external display devices in a field of view, FoV, of the wearable device. The one or more external display devices may be present in a FoV, of the wearable device. Those external display device(s) in the FoV of the wearable device may be determined within a pre-determined range (for example, a few meters) of the wearable device using suitable communication protocols including Wireless-Fidelity, Wi-Fi, Bluetooth, Near Field Communication, NFC, or the like. Thus, the wearable device determines to transmit the second visual content to one or more external display devices 40a-40n based on presence of the one or more external display devices 40a-40n in a field of view, FoV, of the wearable device.

At step S14, the method 100 comprises sending a request to at least one of the one or more external display devices to display the second visual content. The wearable device sends the request to the one of the external display device(s) 40a-40n to display the second visual content.

In one embodiment, sending the request to the one of the one or more external display devices to display the second visual content comprises selecting one of the one or more external display devices based on a distance between the wearable device and the respective external display device. For example, an external display device (i.e., from the external display devices) which is in the FoV of the wearable device and closer to the wearable device is selected. Further, the second visual content to be suitable (i.e., for example, a three dimensional content) for displaying on the selected external display device may be determined and then the second visual content is displayed on a portion of a display region (shown with dotted lines in FIG. 2A) associated with the selected external display device.

In another embodiment, sending the request to the one of the one or more external display devices to display the second visual content comprises sending the request to the content server, requesting the content server 50 to transmit the second visual content 34 to the one of the external display device(s). In such an embodiment, the wearable device is completely offloaded in handling the second visual content, reducing power usage even more in the wearable device.

At step S15, the method 100 comprises causing to display the second visual content, at least outside the first portion of the display region. In an embodiment, instead of transmitting the second visual content to the one of the external display device(s), the wearable device displays the second visual content outside the first portion of the display region. For example, the first visual content is displayed on the first portion of the display region of the wearable device and the second visual content is displayed outside the first portion (i.e., the region excluding the first portion) of the display region of the wearable device as shown in FIG. 2B.

Figure 4:
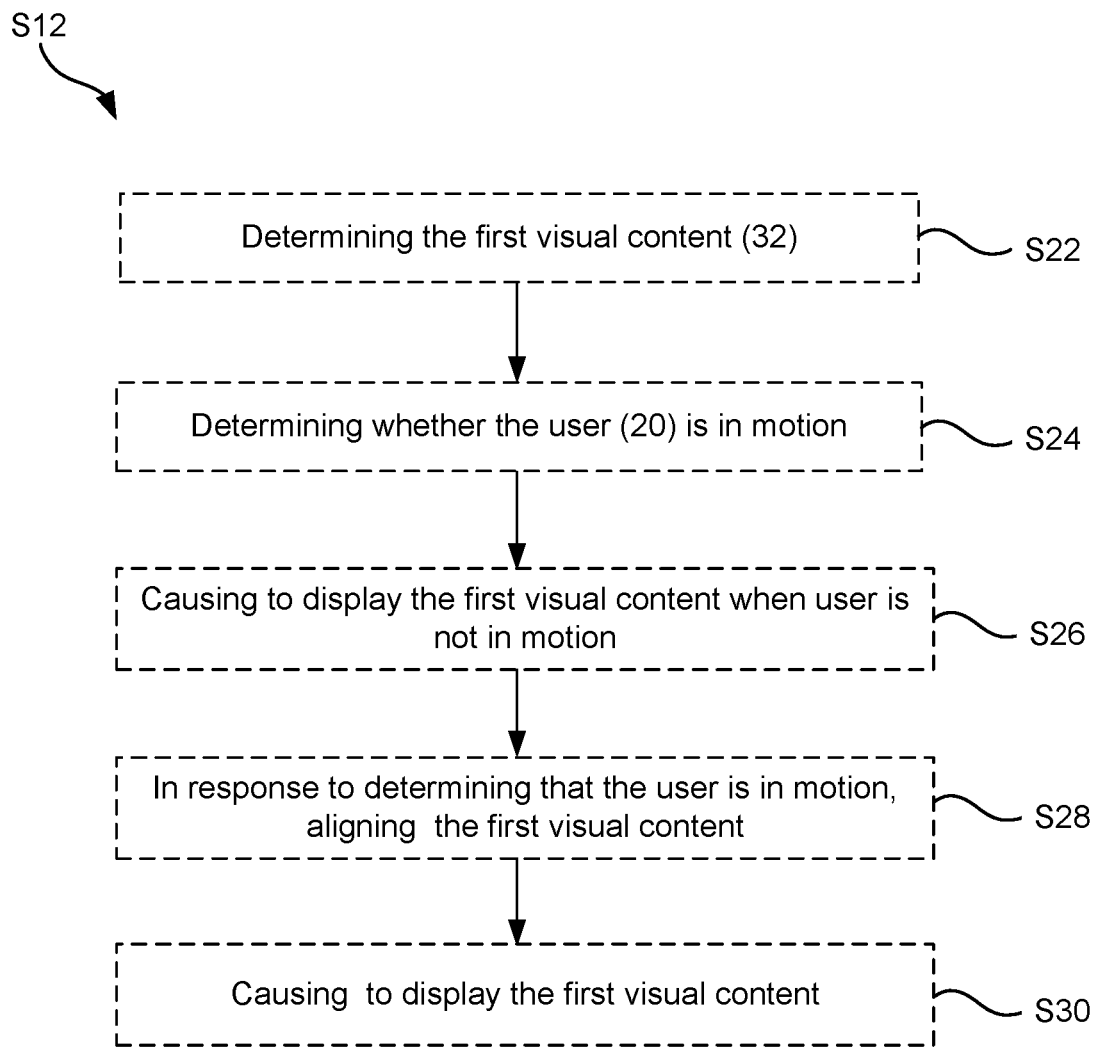
FIG. 4 is a flowchart illustrating various example steps for displaying a first visual content on a first portion of a display region of the wearable device.

FIG. 4 is a flowchart illustrating various example steps for displaying the first visual content on the first portion of the display region of the wearable device. The step S12 as described in FIG. 3, for displaying the first visual content on the first portion of the display region of the wearable device comprises various example steps as described herein. The first visual content being a high resolution content is displayed on the first portion of the display region corresponding to the eye gaze direction of the user. At step S22, the method comprises determining the first visual content to be displayed on the first portion of the display region. For example, the wearable device determines the first visual content being a two-dimensional visual content, which may be suitable for being displayed on the first portion of the display region.

At step S24, the method comprises determining whether the user is in motion using one or more motion determining sensors. The one or more motion determining sensors may include an accelerometer, a pedometer, gyroscope, magnetometer, inertial sensor or any orientation detection sensor or the like. These motion determining sensors may be equipped in the wearable device to determine whether the user is in motion. The accelerometer may be used to measure the translational movement of the user and the pedometer may be used to measure the number of footsteps taken by the user during motion of the user. Thus, the one or more determining sensors may be used for determining the motion of the user.

At step S26, the method comprises causing S26 to display the first visual content on the first portion of the display region, in response to determining that the user is not in motion. The wearable device obtains input data from the one or more motion determining sensors and determines whether the user is in motion or not based on the obtained input data. If the wearable device determines that the user is not in motion, then the wearable device displays the first visual content on the first portion of the display region.

At step S28, the method comprises aligning S28 the first visual content on the first portion of the display region, in response to determining that the user is in motion. If the wearable device determines that the user is in motion, based on the input data obtained from the one or more motion determining sensors, then the wearable device aligns the first visual content on the first portion of the display region such that the first visual content is displayed on the first portion corresponding to the eye gaze direction of the user.

At step S30, the method comprises causing S30 to display the first visual content 32 on the first portion of the display region based on a threshold value associated with the determined motion. The threshold value may be a predetermined value for the determined motion. For example, the first visual content may be rendered (i.e., number of frames per second) based on the threshold value associated with the determined motion. Thus, the first visual content is seamlessly displayed based on the threshold value to provide better user experience when the user is in motion.

The distance between the user and the external display device may affect level of quality of the second visual content being displayed on the external display device. The distance between the user 20 and the external display device can be measured using depth camera(s) placed in the wearable device and the external display device. For example, if the user moves closer to the external display device, the quality of second visual content may be improved on the external display device, and if the user moves further from the external display device, the quality of the second visual content on the external display device may be decreased. Thus, the wearable device determines a change in distance between the wearable device and the external display device 40a and varies the resolution of the second visual content being displayed on the external display device 40a based on the change in distance. Therefore, the resolution of the second visual content decreases with increase in distance between the wearable device and the external display device 40a.

In some embodiments, apart from the distance, actual resolution or capability information of the external display device 40a may be considered for displaying the second visual content. For example among the external display devices the devices which support high definition and low definition are determined based on the capability information, and the second visual content may be offloaded to a high definition display device which maintains targeted perceived user quality even at a larger distance when compared to displaying the second visual content in the low definition display device. Thus, the actual resolution or capability information of the external display device 40a may be considered by the wearable device before for displaying the second visual content on the external display devices 40a.

Alternatively, where there exists an external display device with advanced display capabilities, a combination of resolution and the distance between the wearable device and the external display device may be considered and most or some of the content originally intended to be displayed on the wearable device with maintained perceived user-quality may be displayed at the external display device. In such case, only private content may be displayed at the wearable device.

In another embodiment, the head movements and/or eye gaze movements of the user wearing the wearable device may be used to determine a relation between the quality of the second visual content on the external display device and the quality of the first visual content displayed on the wearable device. For example, when the user is not in motion, the first visual content which (i.e., the high quality content) is displayed in the wearable device and the second visual content is displayed in the external display device. Thus, there may be higher difference between the quality of content being displayed at the wearable device and the external display device. Further, when the user is in motion, with faster head movements, there may be lower difference between the quality of content being displayed at the wearable device and the external display device.

In some embodiments, the second visual content being displayed at the external display device may be aligned or adapted accordingly on the portion of the display region when the external display device is moving and/or vibrating in the FoV of the user.

Figure 5A:
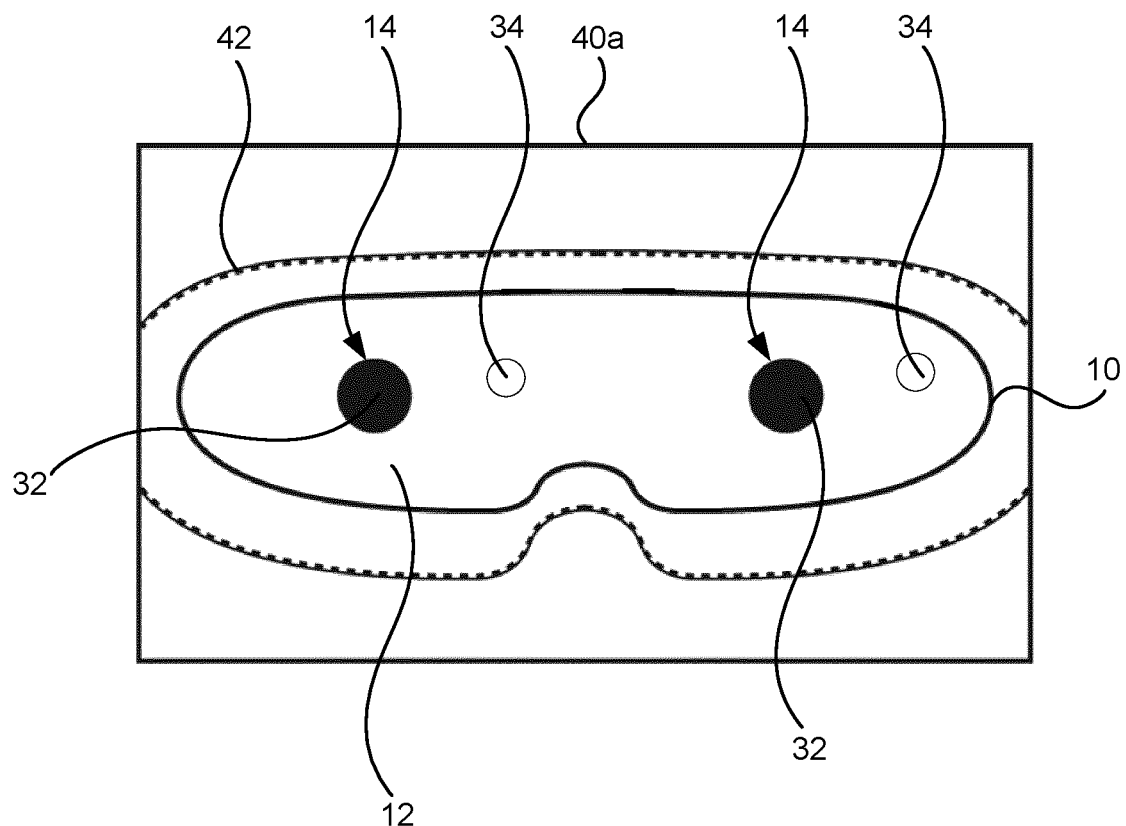
FIG. 5A discloses an example illustration of displaying a second visual content when an external display device is in complete field of view, FoV of the wearable device.

FIG. 5A discloses an example illustration of displaying the second visual content 34 when the external display device 40a is in complete field of view, FoV of the wearable device 10. As depicted in FIG. 5A, the external display device 40a is in complete FoV of the wearable device 10.

The first visual content 32 is displayed on the first portion 14 of the display region 12 and the second visual content 34 is displayed on the external display device 40a (i.e., within the dotted lines). Thus, the wearable device 10 displays high quality content on the first portion 14 of the display region 12 along the eye gaze direction of the user and the low quality content is displayed on the external display device 40a which in this example renders a portion of the display region 42 being slightly more than the FoV of the user 20.

The portion of the display region 42 on the external display device 40a may be slightly larger than the FoV of the wearable device 10 which may be defined based on the type of application, content or context setting, or may be derived per user based on user mobility, change of eye gaze direction of the user. For example, the portion of the display region 42 may depend on a slow-changing content (for example, news broadcast) which may cause less changes in eye gazes/head movements than the same user watching e.g. a sports event.

Figure 5B:
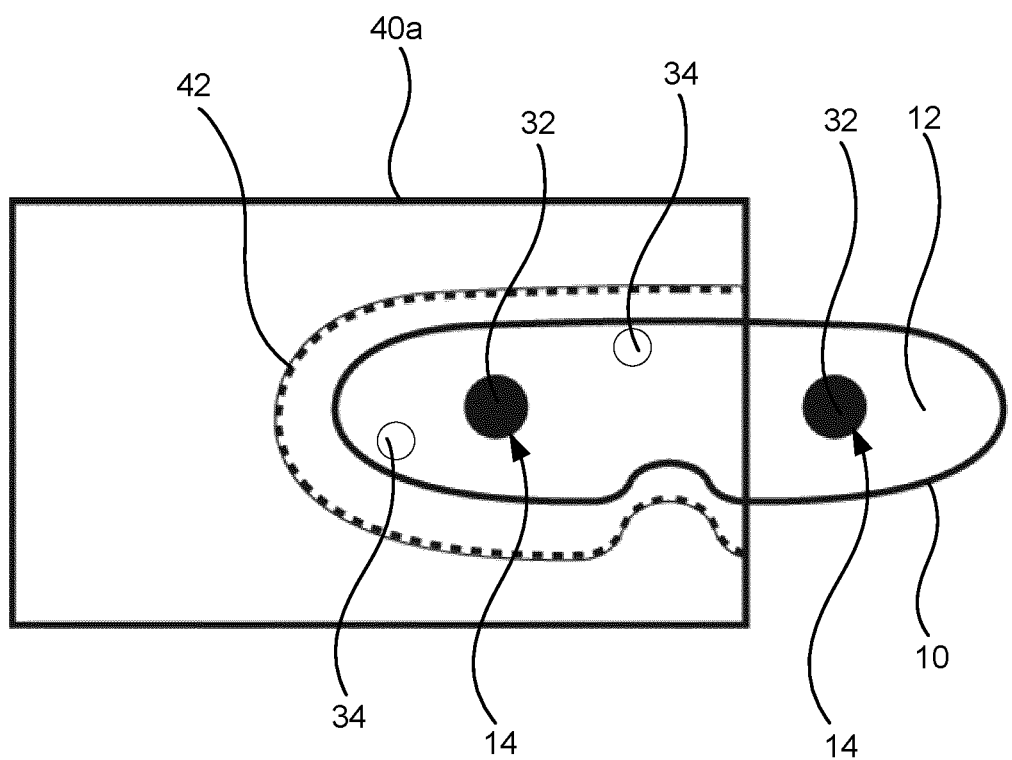
FIG. 5B discloses an example illustration of displaying the second visual content when the external display device is in a partial FoV of the wearable device.

FIG. 5B discloses an example illustration of displaying the second visual content 34 when the external display device 40a is in a partial FoV of the wearable device 10. As depicted in FIG. 5B, the external display device 40a is in partial FoV of the wearable device 10. The wearable device 10 displays the first visual content 32 (i.e., high quality content) on the first portion 14 of the display region 12 along the eye gaze direction of the user and the second visual content 34 (i.e., low quality content) is displayed on the external display device 40a.

Thus, the low quality content is displayed partly by the external display device 40a which is in partial FoV of the user as illustrated in FIG. 5B. In this scenario, since the external display device 40a only displays partly the low quality content, the wearable device 10 needs to display the low quality content that is not covered by the external display device 40a.

Figure 6:
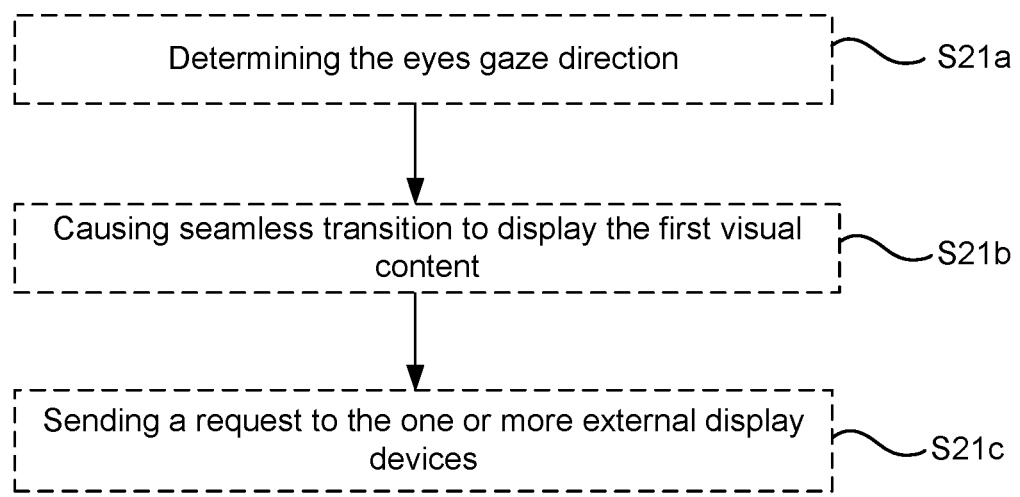
FIG. 6 is a flowchart illustrating various example steps for displaying the first visual content based on a head movement and/or a movement in eye gaze direction of a user.

FIG. 6 is a flowchart illustrating various example steps for displaying the first visual content 32 based on a head movement and/or a movement in eye gaze direction of a user. In an embodiment, at step S12, as described in FIG. 3, the first visual content may be displayed on the first portion of the display region based on the head movement and/or the eye gaze direction of the user. The various steps for displaying the first visual content on the first portion of the display region based on the head movement and/or the eye gaze direction of the user are as described herein.

At step S21a, the method comprises determining a head movement and/or a movement in the eye gaze direction from the first portion of the display region to a second portion of the display region. The head movement and/or the movement in the eye gaze direction may be determined using the gaze tracking camera(s) equipped in the wearable device 10. For example, when the user is viewing the first visual content 20 (for example, a game application) in the first portion of the display region, the user may move his/her head and the eye gaze direction while playing the game application.

In one embodiment, the head movement and the movement in the eye gaze direction may be determined based on the identified type of content and/or the application.

In another embodiment, the head movement and the movement in the eye gaze direction may be determined based on occurrence of one or more events in a predetermined range of the wearable device. For example, the events may include visual events in the first visual content and the second visual content, events occurring in real world including auditory events, perceptive events and events related to haptic feedback or the like.

Due to the type of first visual content, or the application, or the occurrence of the events in the predetermined range of the wearable device, the eye gaze direction may shift from the first portion of the display region to the second portion of the display region.

Figure 7:
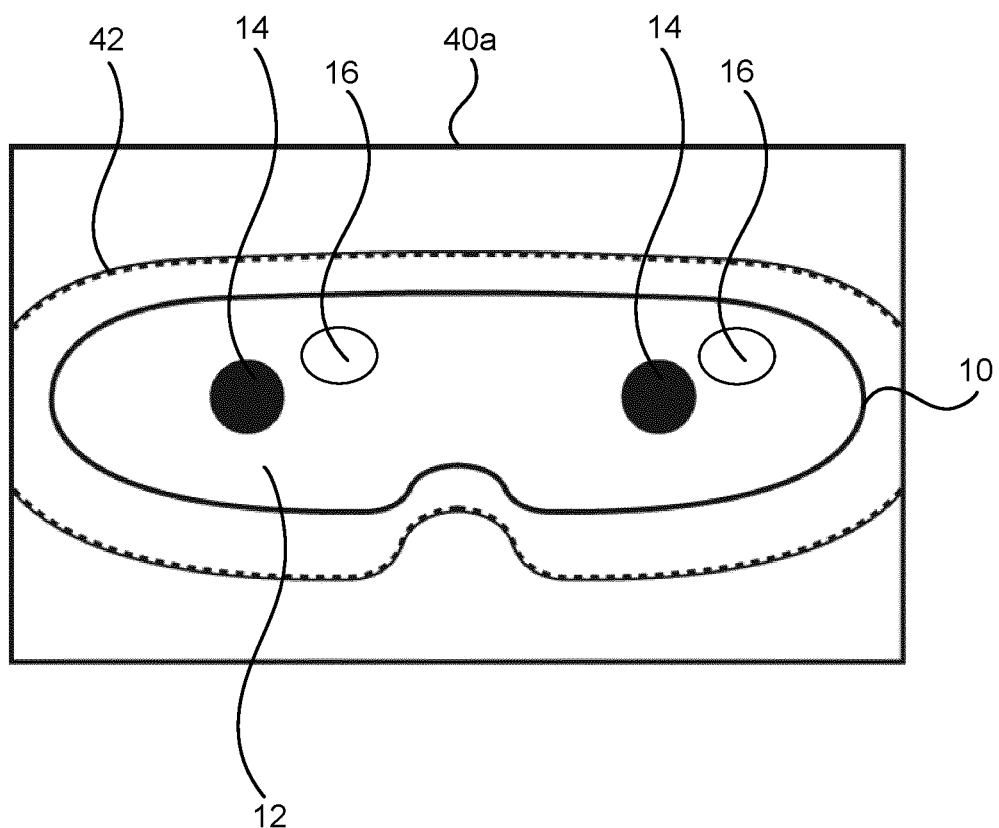
FIG. 7 is an example illustration of displaying the first visual content based on the head movement and/or the movement in eye gaze direction of a user.

At step S21b, referring to FIG. 7, the method comprises causing seamless transition to display the first visual content 32, on the second portion 16 of the display region 12 based on the determined head movement and/or the movement in the eye gaze direction. When the eye gaze direction shifts from the first portion 14 of the display region 12 to the second portion 16 of the display region 12, the wearable device 10 allows a seamless transition to display the first visual content, on the second portion 16 of the display region 12.

In an embodiment, the second portion 16 of the display region 12 may be predicted based on the determined head movement and/or the movement in the eye gaze direction, while displaying the first visual content on the first portion 14 of the display region 12. For example, the wearable device 10 obtains input from the gaze tracking camera(s) which determine the movement in the eye gaze direction from the first portion 14 of the display region 12. The wearable device 10 may predict the second portion 16 of the display region 12 using the input obtained from the gaze tracking camera(s). Thus, the second portion of the display region 12 may be predicted based on the determined head movement and/or the movement in the eye gaze direction. Further, the wearable device 10 seamlessly displays the first visual content on the second portion 16 of the display region 12.

In another embodiment, wearable device 10 may utilize image processing and object detection and recognition techniques for predicting the second portion 16 of the display region 12. For example, if a certain object appears within a scene, and within the FoV of the wearable device 10, but not currently being gazed by the user, and the wearable device 10 determines that the user shifts the gaze to the detected (and possibly recognized) object. Thus, the wearable device 10 may guide the user to said object by displaying the object with higher quality.

At step S21c, the method comprises sending a request to the one or more external display devices to display the second visual content based on the determined head movement and/or the movement in the eye gaze direction. The wearable device sends the request to the one or more external display devices to display the second visual content.

FIG. 7 is an example illustration of displaying the first visual content 32 based on a head movement and/or a movement in eye gaze direction of the user. The first visual content is being displayed on the first portion 14 of the display region and the external display device 40a is in complete FoV of the wearable device 10 as shown in FIG. 7. When the first visual content is being displayed on the first portion 14 of the display region 12, corresponding to the eye gaze direction of the user, due to the type of first visual content being displayed, there may be a movement in the eye gaze direction. For example, the movement in the eye gaze direction may be from the first portion 14 to the second portion 16. The second portion 16 of the display region 12 may be predicted based on the determined head movement and/or the movement in the eye gaze direction using the gaze tracking camera(s). Upon predicting the second portion 16 of the display region 12, the first visual content is displayed on the second portion 16.

With prediction of the second portion 16, the wearable device 10 displays the first visual content (i.e., high-quality content) in the predicted second portion 16 corresponding to the gazing direction of the user in parallel with the already ongoing rendering in the first portion 14 to be prepared for quick gaze movement from the first portion 14 to the second portion 16.

In a similar aspect, based on change in eye gaze direction, the external display device 40a may also utilize information related to prediction of the second portion 16 of the display region 12 to prepare its associated upcoming second visual content (i.e., the low-quality content) on the predicted portion of the display region.

Figure 8:
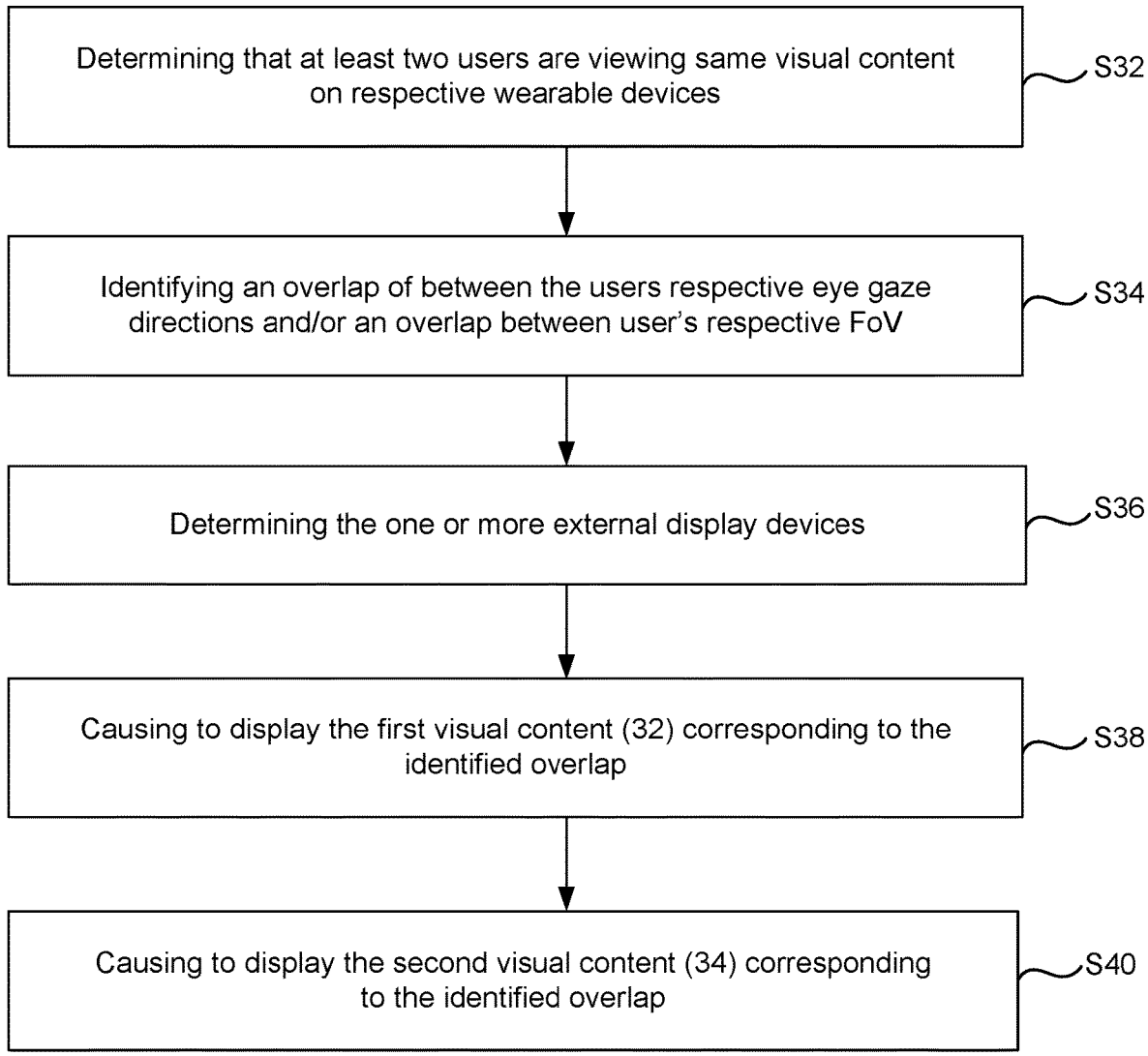
FIG. 8 is a flowchart illustrating various example steps involved in transmitting the second visual content to external display device(s)

FIG. 8 is a flowchart illustrating various example steps involved in transmitting the second visual content to the one or more external display devices. The second visual content is transmitted to the one or more external display devices when two or more users are viewing the same visual content on their respective wearable devices and based on presence of the one or more external display devices in the FoV of the respective wearable devices.

Figure 9:
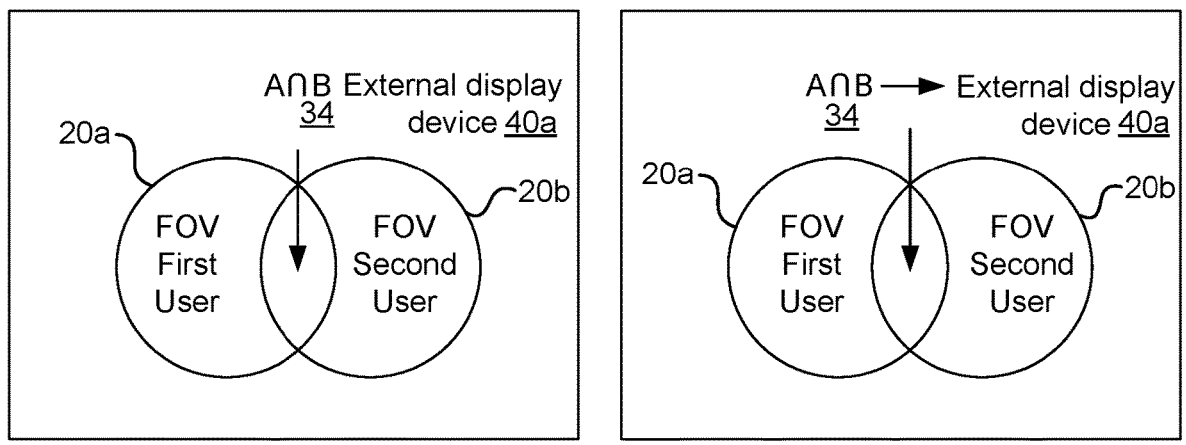
FIG. 9 is an example illustration of displaying the second visual content on the external display device(s) based on an overlap between FoV of the users.

At step S32, referring to FIG. 9, the method comprises determining that at least two users 20a and 20b are viewing same visual content on respective wearable devices. For example, the users 20a and 20b may be viewing a sports event on respective wearable devices. The users 20a and 20b may have some service subscription, which allows the same visual content being brought to their respective wearable devices.

At step S34, the method comprises identifying an overlap of the user's respective eye gaze directions and/or an overlap between the user's respective FoV of the wearable devices as shown in FIG. 9. When the users 20a and 20b are viewing the same visual content respective wearable devices, there exists an overlap of the user's respective eye gaze directions and/or an overlap between the user's respective FoV of the wearable devices. The overlap of the user's respective eye gaze directions and/or the overlap between the user's respective FoV of the wearable devices may be determined using the gaze tracking camera(s) equipped in respective wearable devices. For example, the overlap may include an intersection region or a common region between the user's respective eye gaze directions and/or the user's respective FoV of the wearable devices. The term "overlap" may be defined with respect to what "users see" and it may be understood as either overlapping areas of users respective "gazing" or in respect to overlaps between users' respective "peripheral" vision. It can furthermore be understood that associated principles describing said vision overlaps (i.e. A∩B area 34) between user A's and user B's peripheral vision e.g. considering pre-allocated/pre-rendered borders to facilitate and mitigate for rapid user "movements", where said border areas may be considered a function of users' respective head movements, said speeds and associated steadiness, lack of or presence of small scale oscillations/vibrations, etc., in principle are applicable for said users gazing areas. Thus, "vision overlap" may therefore henceforth be understood as principally applicable both for gazing and peripheral vision.

At step S36, the method comprises determining the one or more external display devices (for example, external display device 40a as shown in FIG. 9) in the FoV of the respective wearable devices. The presence of the external display device 40a in the FoV of the respective wearable devices may be determined using suitable communication protocols such as Wi-Fi, NFC, or the like.

At step S38, the method comprises causing to display the first visual content corresponding to the identified overlap between the user's respective eye gaze directions on the external display device 40a as shown in FIG. 9. The first visual content 32 (i.e., a high quality content) may be displayed corresponding to the identified overlap between the user's respective eye gaze directions on the external display device 40a. Thus, the high quality content may be displayed on the external display device 40a for the identified overlap between the user's respective eye gaze directions.

At step S40, the method comprises causing to display the second visual content (i.e., A∩B 34 as shown in FIG. 9) corresponding to the identified overlap between the user's respective FoV on the external display device 40a. The second visual content (i.e., a low quality content) may be displayed corresponding to the identified overlap between the user's respective FoV on the external display device 40a.

FIG. 9 is an example illustration of displaying the second visual content on the external display device 40a based on an overlap between FoV of the users 20a and 20b. As depicted in FIG. 9, the users 20a and 20b are wearing the wearable devices (only schematically illustrated), an overlap area between the user's respective FoV occurs in the intersection of the two users' 20a and 20b respective renderings. The overlap between user 20a and user 20b rendering areas covers same physical area and it is beneficial to move the overlap area i.e., A∩B 34 to the external display device 40a. The second visual content (i.e., A∩B 34, which is a low quality content) may be displayed corresponding to the identified overlap between the user's respective FoV on the external display device 40a. The transmission or offloading of mutual content to the external display device 40a reduces a need for local processing in the wearable devices and thereby reducing the power consumption which improve battery lifetime of the wearable devices.

FIG. 10 is an example illustration of displaying the second visual content on the external display device 40a when users 20a and 20b are moving away from each other. When the users 20a and 20b move from their positions while the same visual content is being displayed on their respective wearable devices, the user's 20a and 20b respective FoV and eye gazing directions may move, thereby resulting FoV overlap area varies over time.

As depicted in FIG. 10, when the users 20a and 20b move (i.e. their bodies, heads, wearable devices FoV, etc.) so that their respective FOV-motion vectors during a time span (t; t+Δt) are estimated to be non-intersecting. It is to be understood that the user's 20a and 20b respective FoV are moving apart (diverging), and the resulting overlapping area decreases during said span of time. When the overlap area i.e., A∩B 34 decreases, the second visual content which is to be displayed on the external display device 40a decreases. Therefore, the A∩B 34 (i.e., a low quality content) may be displayed corresponding to the identified overlap between the user's respective FoV on the external display device 40a. It is to be noted that depending on the individual users' movements (i.e. intersection of motion vectors), the resources associated with rendering of the second visual content (i.e., A∩B 34) changes over time.

Figure 11:
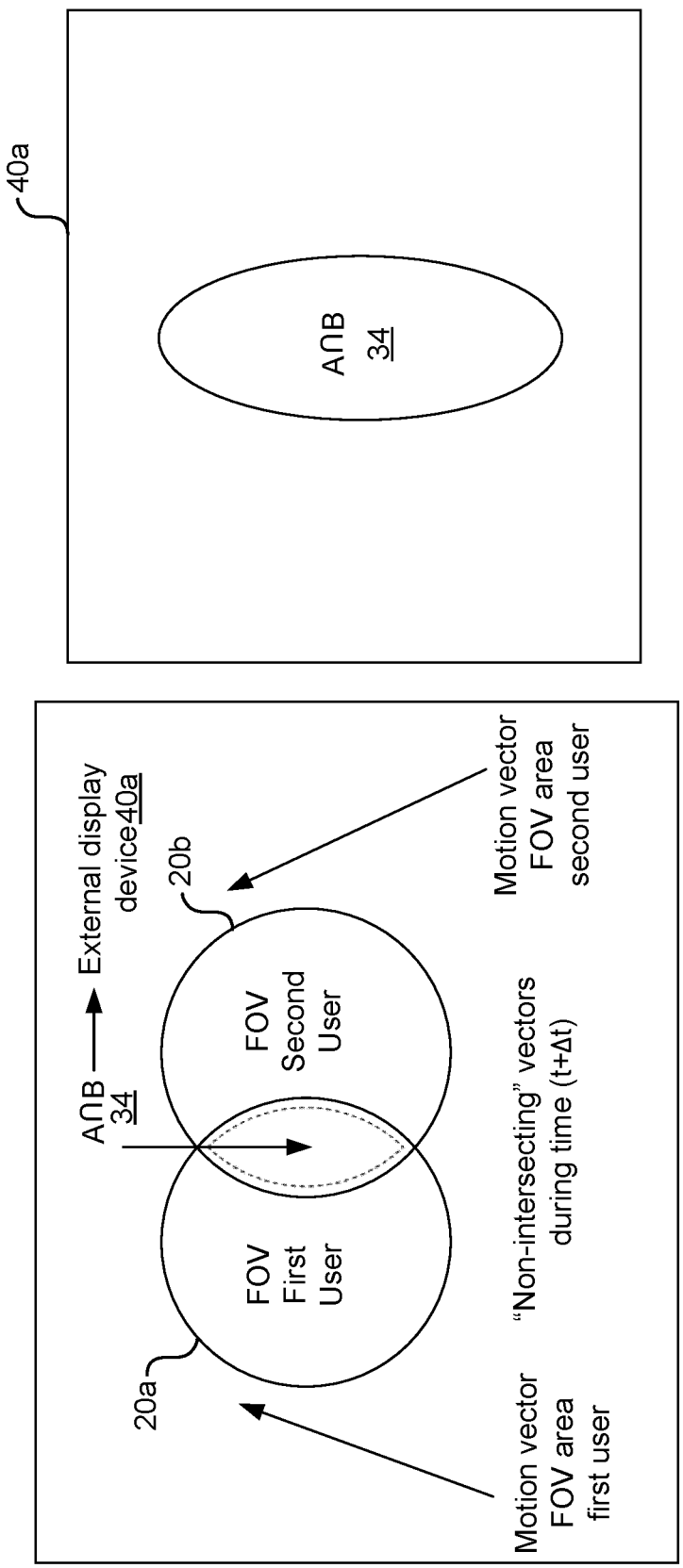
FIG. 11 is an example illustration of displaying the second visual content on the external display device(s) when users are moving in same direction.

FIG. 11 is an example illustration of displaying the second visual content on the external display device 40a when users are moving towards each other.

Although in the above described embodiments, the wearable device performs various steps for controlling display of content, it should be noted that the various embodiments may be performed by the content server for controlling the display of content. Therefore, it is possible that the various steps performed by the wearable device may be executed at the content server. The content server communicates with the wearable device and the external display device through the network for controlling the display of content.

For example, the content server stores the content to be rendered by the wearable device and the external display device. The content server identifies the first visual content (i.e., a high resolution content and the second visual content (i.e., a low resolution content) from the content. Further, the content server obtains information related eye gaze direction of the user, movement information of the user, and head movement and/or a movement in the eye gaze direction of the user from the wearable device. The various steps performed by the content server for controlling the display of content are as described herein.

The content server may be configured to display the first visual content on the first portion of the display region, corresponding to an eye gaze direction of the user. The content server may be configured to determine to transmit the second visual content to the external display device(s) based on presence of the external display devices in the FoV of the wearable device. Further, the content server may be configured to send a request to at least one of the external display device(s) to display the second visual content.

In an embodiment, the content server may be configured to display the second visual content, outside the first portion of the display region of the wearable device. In some embodiments, the content server may be configured to align the first visual content on the first portion of the display region of the wearable device when the user is in motion.

For example, the content server may be configured to predict the second portion of the display region on the wearable device based on the determined head movement and/or the movement in the eye gaze direction.

In some embodiments, the content server may be configured to cause seamless transition of displaying the first visual content from the first portion of the wearable device to the second portion of the display region based on the obtained head movement and/or the movement in the eye gaze direction from the wearable device.

In some embodiments, in order to determine to transmit the second visual content to the external display devices, the content server may be configured to determine that at least two users are viewing same visual content on respective wearable devices, identify an overlap of the users respective eye gaze directions and/or an overlap between the user's respective FoV of the wearable devices and to determine the external display devices in the FoV of the respective wearable devices. Further, the content server may be configured to cause to display the first visual content corresponding to the identified overlap between the users respective eye gaze directions on the at least one of the external display device(s). Furthermore, the content server may be configured to cause to display the second visual content corresponding to the identified overlap between the user's respective FoV on the at least one of the external display device(s).

The content server may be configured to obtain a movement pattern of the users 20a and 20b viewing the same visual content on respective wearable devices. The content server may be configured to predict an overlap between the user's respective eye gaze directions and/or an overlap between the user's respective FoV based on the movement pattern. Further, the content server may be configured to transmit the second visual content to at least one of the external display device(s) based on the prediction.

Now referring to FIG. 11, with the users 20a and 20b moving in an opposite manner, their respective motion vectors during the time span (t; t+Δt) are becoming intersecting. It is to be understood that the users' respective FoV are moving together and the resulting overlap increases during the span of time.

With availability of respective motion vectors of the wearable devices, the content server may deduct future transmission and processing requirements to provide served wearable devices with the content. The content server identifies an emerging increasing overlap between at least two wearable devices, the content server may deduct increased potential for transmitting or offloading said overlapping content to the external display device 40a and the radio resources previously required to provide to the wearable devices with their previous amount of content may be reduced.

When the users 20a and 20b are moving towards each other, the content server identifies an emerging decreasing overlap between the wearable devices. The content server may further deduct an upcoming decreased possibility for offloading to the external display device 40a, and the amount of radio resources to be required providing wearable devices with the requested content may be increased. Consequently, the content server may derive that less radio resources are available for other communication purposes (e.g. to serve other wearable devices in same cellular cell) in an upcoming time period Δt.

The increase or decrease in amount of radio resources estimated are available for other communication purposes in same cellular communication system. The content server may predict which other communication services that may be supported in said estimated available resources in the time span (t; t+Δt).

In some examples, when the content server determines that at least two wearable devices hold a complete overlap of their display areas, the content server may determine a maximum amount of offloading to the external display device 40a. Further, when the users 20a and 20b are moving in the opposite direction with no overlap of FoVs, the content server may deduct a corresponding minimum amount of possible offloading. Thus, when combining the maximum amount of offloading and minimum amount of possible offloading, the content server may derive maximum amount of resources being possible to save/spend for a specific number of served wearable devices.

In another example scenario, with at least two users, involved in distributing information and the visual areas are overlapping, then said information is typically shared between the wearable devices and their corresponding content server 50. In a situation where a link between one of the wearable devices and the content server 50 is limited by, said "overlap information" (where gazing/FOV directions are being considered), the information may be distributed directly to a neighbouring user via any direct link transmission. Further, a receiving user aggregates a total content and the wearable device of the receiving user determines the content to offload, and what to content to render where"— information message that includes offload area information from both the users. In this aspect D2D SideLink may be suitable to send any time critical data offloading-relevant data to its neighbouring user via D2D SideLink instead of via ordinary uplink to the content server for distribution.

Figure 12A:
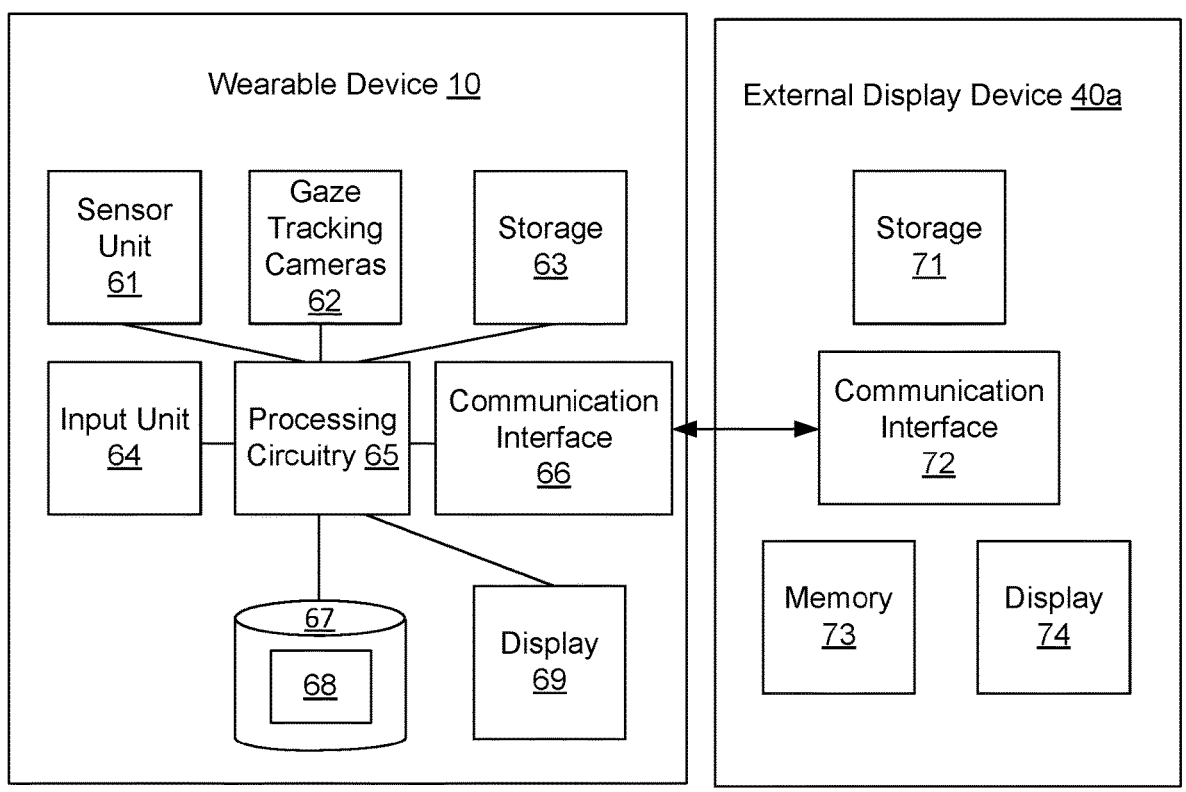
FIG. 12A is an example schematic block diagram of the wearable device and the external display device.

FIG. 12A is an example schematic block diagram of the wearable device 10 and the external display device 40a of FIG. 1. The wearable device 10 and the external display device 40a includes various components as illustrated in FIG. 12A. At first, the wearable device 10 is described. As illustrated in FIG. 12, the wearable device 10 includes a processing circuitry 65. The processing circuitry 65 is provided using any combination of one or more of a suitable central processing unit (CPU), multiprocessor, microcontroller, digital signal processor (DSP), application specific integrated circuit etc., capable of executing software instructions 68 stored in a memory 67 which can thus be a computer program product. The processing circuitry 65 can be configured to execute the method described with reference to FIGS. 3-4 and FIGS. 6 and 8 as described above.

The wearable device 10 further comprises a sensor unit 61, gaze tracking cameras 62, a storage 63, an input unit 64, a communication interface 66, a memory 67 storing software instructions 68 and a display 69.

The sensor unit 61 includes motion determining sensors. The sensor unit 61 may be configured to receive input from the motion determining sensors, e.g., accelerometer, gyroscope, magnetometer, inertial sensor or any orientation detection sensor or the like for processing movement related the user wearing the wearable device 10. The sensor unit 61 may be configured to continuously process movements of the user in any direction within a pre-determined space, e.g., a space pre-determined as a reachable space for the user.

The gaze tracking cameras 62 may include RGB cameras, depth cameras or the like for tracking the eye gaze direction of the user. The gaze tracking cameras continuously track the eye gaze direction of the user on the display region of the wearable device 10. The depth cameras may be used to measure the distance between the wearable device 10 and the one or more external display devices in the FoV of the wearable device 10. For example, the depth cameras may continuously measure the distance between the wearable device 10 and the one or more external display devices 40a-40n when the user is in motion.

The input unit 64 may be configured to receive input from the user. The input unit 64 may be configured to recognize user input on the wearable device e.g., a gesture performed on the wearable device 10 or a voice command to the wearable device 10. For example, the input unit 64 may be configured to recognize the gesture as a touch gesture, a swipe gesture, a pinch gesture, a drag gesture, a rotate gesture or the like. In an embodiment, the input comprises one or more parameters related to display of the first visual content on the first portion of the display region. For example, the user may perform a swipe gesture to change the first visual content being displayed on the first portion of the display region. In another example, the user may perform a pinch gesture to change the gaze area size on the first portion of the display region. Thus, the user may provide an input comprising the parameters related to display of the first visual content. The first visual content on the first portion of the display region may be displayed based on the obtained input.

The plurality of gestures may be registered in a storage 63 of the wearable device 10. For example, various user gestures such as but not limited to a touch gesture, a swipe gesture, a pinch gesture, a drag gesture, a rotate gesture, a zoom gesture, a tap gesture, a double tap gesture or the like may be stored in the storage 63 and the user input interpretation may be associated with each gesture. The input unit 64 may be communicatively coupled to the storage 63 so that the input unit 64 may interpret a user input by matching a gesture with the plurality of stored gestures.

The communication interface 66 can be for example a I/O interface for communicating with external entities such as with the external display devices and the wearable devices (i.e., over a communication link) and the network 11. For instance, the I/O interface can be used for communication using any suitable communication protocol, e.g. any one or more of Ethernet, Bluetooth, any one of the IEEE 802. nx standards (also known as Wi-Fi), Bluetooth Low Energy (BLE), ZigBee, etc.

The memory 67 can be any combination of read and write memory (RAM) and read only memory (ROM). The memory 67 also comprises persistent storage, which, for example, can be any single one or combination of magnetic memory, optical memory, solid state memory or even remotely mounted memory.

The memory 67 is also provided for reading and/or storing data during execution of software instructions 68. The memory 67 can be any combination of read and write memory (RAM) and read only memory (ROM).

The display 69 may be configured to provide the display region on the wearable device 10. The display region may be configured to visually reflect a content, an application or web browser content or the like. Other components of the wearable device 10 are omitted in order not to obscure the concepts presented herein.

Now, the various components of the external display device 40a are described. As illustrated in the FIG. 12, the external display device 40a includes components such as a storage 71, a communication interface 72, a memory 73 and a display 74. Other components of the external display device 40a are omitted in order not to obscure the concepts presented herein.

The storage 71 may include a plurality of gestures. For example, various user gestures such as but not limited to a touch gesture, a swipe gesture, a pinch gesture, a drag gesture, a rotate gesture, a zoom gesture, a tap gesture, a double tap gesture or the like may be stored in the storage 71.

The communication interface 72 can be for example a I/O interface for communicating with external entities such as with the wearable device 10 (i.e., over a communication link) and the network. For instance, the I/O interface can be used for communication using any suitable communication protocol, e.g. any one or more of Ethernet, Bluetooth, any one of the IEEE 802. nx standards (also known as Wi-Fi), Bluetooth Low Energy (BLE), ZigBee, etc.

The memory 73 is provided for reading and/or storing data during execution of software instructions. The memory 73 can be any combination of read and write memory (RAM) and read only memory (ROM).

The display 74 is a display which can display computer-rendered content, e.g. rendered by the external display device 40a.

Figure 12B:
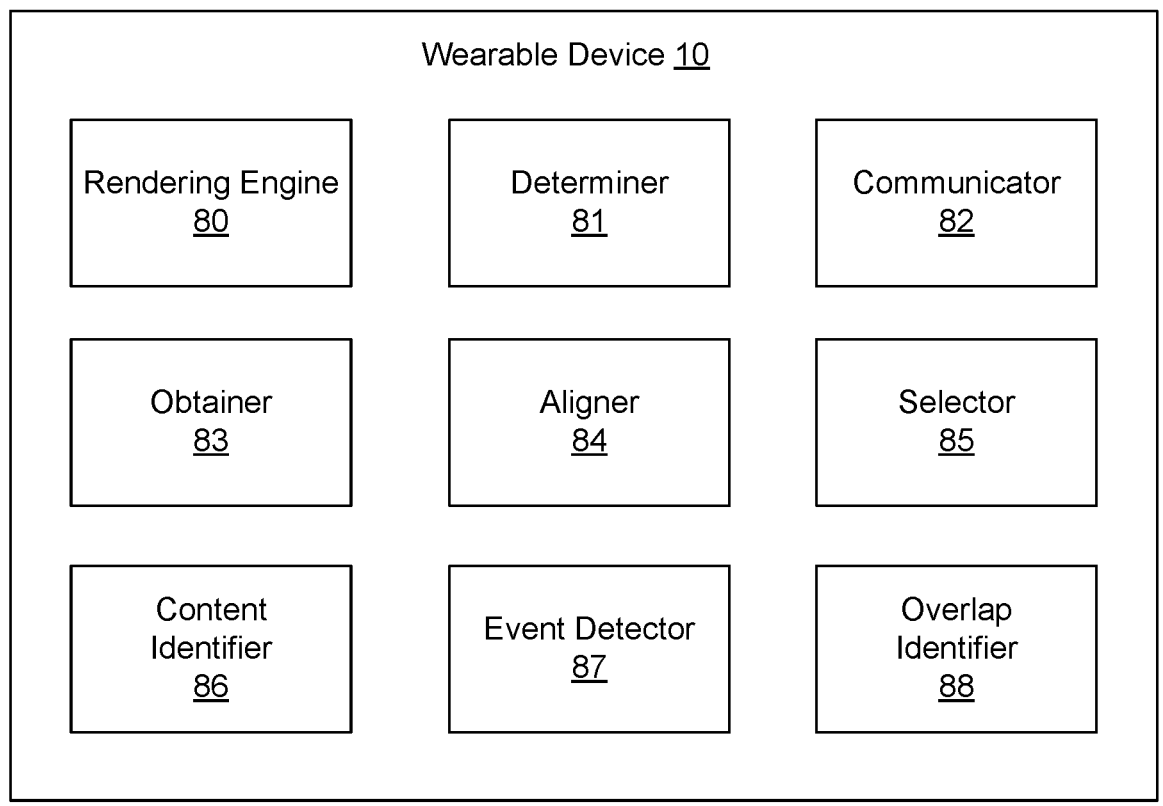
FIG. 12B is an example schematic diagram showing functional modules of the wearable device 10 of FIG. 12A.

FIG. 12B is an example schematic diagram showing functional modules of the wearable device 10 of FIG. 12A. The functional modules of the wireless device 10 are implemented using software instructions such as a computer program executing in the wearable device 10. Alternatively, the functional modules are implemented using hardware, such as any one or more of an Application Specific Integrated Circuit (ASIC), an Field Programmable Gate Array (FPGA), or discrete logical circuits. The functional modules correspond to the steps in the methods illustrated in FIGS. 3-4 and FIGS. 6 and 8. The functional modules of the wearable device 10 comprises a rendering engine 80, a determiner 81, a communicator 82, an obtainer 83, an aligner 84, a selector 85, a content identifier 86, an event detector 87 and an overlap identifier 88.

The rendering engine 80 may be configured to display the first visual content on the first portion of the display region corresponding to the step S12 of FIG. 3. The rendering engine 80 may be configured to display the second visual content, at least outside the first portion of the display region corresponding to the step S15 of FIG. 3.

Further, the rendering engine 80 may be configured to display the first visual content on the first portion of the display region, when the user is not in motion, corresponding to the step S24 of FIG. 4. Further, the rendering engine 80 may be configured to display the first visual content on the first portion of the display region based on a threshold value associated with the determined motion, corresponding to the step S30 of FIG. 4.

The rendering engine 80 may be configured to vary the resolution of the second visual content being displayed on the one or more external display devices based on the change in distance between the wearable device and the external display devices. The rendering engine 80 may be configured to cause seamless transition corresponding to the step S12b of FIG. 6.

The rendering engine 80 may be configured to display the first visual content corresponding to the step S38 of FIG. 8. The rendering engine 80 may be configured to display the second visual content corresponding to step S40 of FIG. 8.

The determiner 81 may be configured to transmit the second visual content to the external display devices, corresponding to the step S13 of FIG. 3.

The determiner 81 may be configured to determine the first visual content corresponding to the step S22 of FIG. 4. The determiner may be configured to determine whether the user is in motion corresponding to the step S24 of FIG. 4. The determiner 81 may be configured to determine the eye gaze direction corresponding to step S21a of FIG. 6. The determiner may be configured to determine that at least two users are viewing same visual content corresponding to the step S32 of FIG. 8. The determiner may be configured to determine the one or more external display devices corresponding to the step S36 of FIG. 8.

The communicator 82 may be configured to send a request to at least one of the one or more external display devices corresponding to the step S14 of FIG. 3.

The obtainer 83 may be configured to obtain the input comprising the one or more parameters related to display of the first visual content on the first portion of the display region.

The aligner 84 may be configured to align the first visual content corresponding to the step S28 of FIG. 4. The selector 85 may be configured to select the at least one of the one or more external display by sending the request corresponding to the step S14 of FIG. 3.

The content identifier 86 may be configured to identify the type of content and/or the application being displayed on the first portion of the display region for determining the head movement and/or the movement in the eye gaze direction corresponding to the step S21a of FIG. 6.

The event detector 87 may be configured to detect occurrence of one or more events causing the head movement and/or the movement in the eye gaze direction corresponding to the step S21a of FIG. 6.

The overlap identifier 88 may be configured to identify the overlap of the users respective eye gaze directions and/or an overlap between the user's respective FoV of the wearable devices corresponding to step S34 of FIG. 8.

Figure 13:
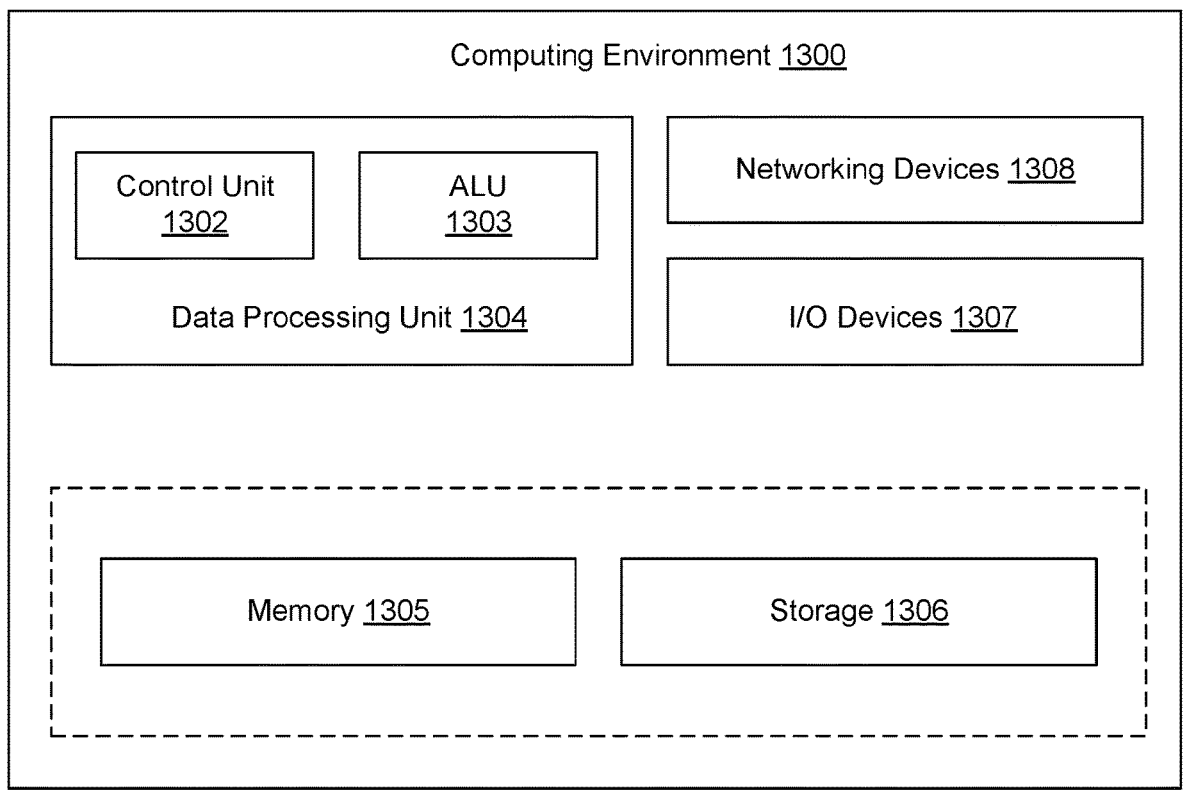
FIG. 13 discloses an example computing environment.

FIG. 13 illustrates an example computing environment 1300 implementing the method and the wearable device 10 for controlling display of content. As depicted in FIG. 13, the computing environment 1300 comprises at least one data processing unit 1304 that is equipped with a control unit 1302 and an Arithmetic Logic Unit (ALU) 1303, a memory 1305, a storage 1306, plurality of networking devices 1308 and a plurality Input output (I/O) devices 1307. The data processing unit 1304 is responsible for processing the instructions of the algorithm. For example, the data processing unit 1304 is equivalent to the processing circuitry of the wearable device. The data processing unit 1304 is capable of executing software instructions stored in memory 1305. The data processing unit 1304 receives commands from the control unit 1302 in order to perform its processing. Further, any logical and arithmetic operations involved in the execution of the instructions are computed with the help of the ALU 1303.

The data processing unit 1304 causes the wearable device to display the first visual content on the first portion of the display region, corresponding to an eye gaze direction of the user. Further, the data processing unit 1304 causes the wearable device to determine to transmit a second visual content to one or more external display devices based on presence of the one or more external display devices in the FoV of the wearable device. The data processing unit 1304 causes the wearable device to send a request to at least one of the one or more external display devices to display the second visual content.

The overall computing environment 1300 can be composed of multiple homogeneous and/or heterogeneous cores, multiple CPUs of different kinds, special media and other accelerators. The data processing unit 1304 is responsible for processing the instructions of the algorithm. Further, the plurality of data processing units 1304 may be located on a single chip or over multiple chips.

The algorithm comprising of instructions and codes required for the implementation are stored in either the memory 1305 or the storage 1306 or both. At the time of execution, the instructions may be fetched from the corresponding memory 1305 and/or storage 1306, and executed by the data processing unit 1304.

In case of any hardware implementations various networking devices 1308 or external I/O devices 1307 may be connected to the computing environment to support the implementation through the networking devices 808 and the I/O devices 1307.

The embodiments disclosed herein can be implemented through at least one software program running on at least one hardware device and performing network management functions to control the elements. The elements shown in FIG. 13 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The invention claimed is:

1. A method for controlling display of content, presented to a user, the method being performed in a wearable device, the wearable device comprising a head mounted display having a display region, wherein the method comprises:
   causing to display a first visual content on a first portion of the display region, corresponding to an eye gaze direction of the user;
   determining to transmit a second visual content to one or more external display devices based on presence of the one or more external display devices in the field of view (FoV) of the wearable device;
   sending a request to at least one of the one or more external display devices to display the second visual content on the one or more external display devices, simultaneously with displaying the first visual content on the first portion of the display region, and
   displaying the first visual content on the first portion of the display region simultaneously with displaying the second visual content outside the first portion on the one or more external display devices.

2. A computer program product comprising a non-transitory computer readable medium, having thereon a computer program comprising program instructions, the computer program being loadable into a processing circuitry and configured to cause execution of the method of claim 1 when the computer program is run by the processing circuitry.

3. A wearable device for controlling display of content, presented to a user, the wearable device comprising:
- a head mounted display having a display region;
- processing circuitry; and
- a memory storing instructions that, when executed by the processing circuitry, causes the wearable device to:
- display a first visual content on a first portion of the display region, corresponding to an eye gaze direction of the user;
- determine to transmit a second visual content to one or more external display devices based on presence of the one or more external display devices in the field of view (FoV) of the wearable device and in front of the first portion of the display region;
- send a request to at least one of the one or more external display devices to display the second visual content on the one or more external display devices, simultaneously with displaying the first visual content on the first portion of the display region, and
- display the first visual content on the first portion of the display region simultaneously with displaying the second visual content outside the first portion on the one or more external display devices.

4. The wearable device of claim 3, wherein the wearable device is further configured to determine the eye gaze direction, wherein the eye gaze direction is determined based on at least one of:
- a tracked eye gaze direction of the user on the display region of the wearable device,
- an identified type of content or an application being displayed on the first portion of the display region, and
- detected occurrence of one or more events in a predetermined range of the wearable device.

5. The wearable device of claim 3, wherein the wearable device is further configured to:
- determine the first visual content to be displayed on the first portion of the display region;
- determine whether the user is in motion using one or more motion determining sensors;
- cause to display the first visual content on the first portion of the display region, in response to determining that the user is not in motion;
- in response to determining that the user is in motion, align, by an aligner the first visual content on the first portion of the display region; and
- cause to display the first visual content on the first portion of the display region based on a threshold value associated with the determined motion.

6. The wearable device of claim 3, wherein the instructions to send the request comprise instructions that, when executed by the processing circuitry, cause the wearable device to:
- select, by a selector, the at least one of the one or more external display devices based on a distance between the wearable device and the respective external display device;
- determine the second visual content to be suitable for being displayed on the selected at least one external display device of the one or more external display devices; and
- cause to display the second visual content on a portion of a display region associated with the selected at least one external display device of the one or more external display devices, wherein the portion of the display region associated with the one or more external display devices is defined based on a field of view (FoV) of the wearable device, wherein
  - a portion of the display region for displaying the second visual content is a complete FoV of the wearable device,
  - a portion of the display region for displaying the second visual content is a partial FoV of the wearable device, or
  - a portion of the display region for displaying the second visual content is larger than the FoV of the wearable device.

7. The wearable device of claim 3, further comprising instructions that, when executed by the processing circuitry, cause the wearable device to:
- determine a change in distance between the wearable device and the at least one of the one or more external display devices; and
- cause to vary the resolution of the second visual content being displayed on the one or more external display devices based on the change in distance, wherein the resolution of the second visual content decreases with increase in distance between the wearable device and the at least one of the one or more external display devices.

8. The wearable device of claim 3, further comprising instructions that, when executed by the processing circuitry, cause the wearable device to:
- determine a head movement and/or a movement in the eye gaze direction from the first portion of the display region to a second portion of the display region;
- cause seamless transition to display the first visual content, on the second portion of the display region based on the determined head movement and/or the movement in the eye gaze direction;
- send a request to the one or more external display devices to display the second visual content based on the determined head movement and/or the movement in the eye gaze direction.

9. The wearable device of claim 8, wherein the instructions to determine the head movement and/or the movement in the eye gaze direction comprise instructions that, when executed by the processing circuitry, cause the wearable device to:
- identify a type of content and/or an application being displayed on the first portion of the display region; and
- determine the head movement and/or the movement in the eye gaze direction based on the identified type of content and/or the application.

10. The wearable device of claim 8, wherein the instructions to determine the head movement and/or the movement comprise instructions that, when executed by the processing circuitry, cause the wearable device to detect, by an event detector, occurrence of one or more events causing the head movement and/or the movement in the eye gaze direction in a predetermined range of the wearable device.

11. The wearable device of claim 10, wherein the instructions to detect occurrence of the one or more events comprise instructions that, when executed by the processing circuitry, cause the wearable device to:
- determine a head movement and/or the movement in the eye gaze direction using movement sensors equipped in the wearable device; and detect, by the event detector, the occurrence of the one or more events by analysing the head movement(s) and/or the movement(s) in the eye gaze direction.

12. The wearable device of claim 10, wherein the one or more events comprises at least one of: visual events in the first visual content and the second visual content, events occurring in real world including auditory events, perceptive events and events related to haptic feedback.

13. The wearable device of claim 8, further comprising instructions that, when executed by the processing circuitry, cause the wearable device to:
   predict the second portion of the display region based on the determined head movement and/or the movement in the eye gaze direction, while displaying the first visual content on the first portion of the display region;
   cause seamless transition to display the first visual content, on the predicted second portion of the display region; and
   send a request to the one or more external display devices to display the second visual content based on the determined head movement and/or the movement in the eye gaze direction.

14. The wearable device of claim 3, wherein the instructions to determine to transmit comprise instructions that, when executed by the processing circuitry, cause the wearable device to:
   determine that at least two users are viewing same visual content on respective wearable devices;
   identify, by an overlap identifier, an overlap of the users respective eye gaze directions and/or an overlap between the user's respective FoV of the wearable devices; and
   determine the one or more external display devices in a FoV of the respective wearable devices.

15. The wearable device of claim 14, further comprising instructions, that when executed by the processing circuitry, cause the wearable device to:
   cause to display the first visual content corresponding to the identified overlap between the users respective eye gaze directions on the at least one of the one or more external devices; and
   cause to display the second visual content corresponding to the identified overlap between the user's respective FoV on the at least one of the one or more external display devices.

16. The wearable device of claim 14, wherein the instructions to determine to transmit comprise instructions that, when executed by the processing circuitry, cause the wearable device to:
   determine a movement pattern of the at least two users viewing the same visual content on respective wearable devices;
   predict, by the overlap identifier, an overlap between the users respective eye gaze directions and/or predicting an overlap between the user's respective FoV based on the movement pattern; and
   determine to transmit the second visual content to at least one of the one or more external display devices based on the prediction.

17. The wearable device of claim 14, wherein the instructions to determine the movement pattern comprise instructions that, when executed by the processing circuitry, cause the wearable device to:
   identify a change in users respective eye gaze directions and/or the user's respective FoV; and
   determine the movement pattern based on the change in the users respective eye gaze directions and/or the user's respective FoV.

18. The wearable device of claim 14, further comprising instructions that, when executed by the processing circuitry cause the wearable device to:
   determine to transmit the second visual content corresponding to the identified overlap between the user's respective FoV to the at least one of the one or more external display devices based on the determined movement pattern.

19. The wearable device of claim 3, wherein a resolution of the first visual content is higher than a resolution of the second visual content.

* * * * *